United States Patent [19]
Bourne et al.

[11] Patent Number: 5,835,684
[45] Date of Patent: Nov. 10, 1998

[54] METHOD FOR PLANNING/CONTROLLING ROBOT MOTION

[75] Inventors: David Alan Bourne, Pittsburgh, Pa.; Sivaraj Sivarama Krishnan, Bangalore, India

[73] Assignees: Amada Company, Ltd., Kanagawa, Japan; Amada America, Inc., Calif.

[21] Appl. No.: 338,115

[22] Filed: Nov. 9, 1994

[51] Int. Cl.[6] .................................................. G06F 15/20
[52] U.S. Cl. ......................... 395/90; 364/461; 364/474.2
[58] Field of Search ............................ 395/90; 364/461, 364/474.2

[56] References Cited

U.S. PATENT DOCUMENTS

| | | | |
|---|---|---|---|
| 4,745,812 | 5/1988 | Amazeen et al. | 73/777 |
| 4,942,767 | 7/1990 | Haritonidis et al. | 73/705 |
| 4,949,277 | 8/1990 | Trovato et al. | 395/90 |
| 5,005,394 | 4/1991 | Sartorio et al. | 72/10 |
| 5,047,916 | 9/1991 | Kondo | 395/90 |
| 5,058,406 | 10/1991 | Sartorio et al. | 72/9 |
| 5,083,256 | 1/1992 | Trovato et al. | 364/461 |
| 5,092,645 | 3/1992 | Okada | 294/86.4 |
| 5,307,282 | 4/1994 | Conradson et al. | 364/468 |
| 5,513,299 | 4/1996 | Terasaki et al. | 395/90 |

FOREIGN PATENT DOCUMENTS

| | | |
|---|---|---|
| 0301527 | 2/1989 | European Pat. Off. . |
| 0335314 | 10/1989 | European Pat. Off. . |
| 0355454 | 2/1990 | European Pat. Off. . |
| 3110018 | 5/1991 | Japan . |
| 3110022 | 5/1991 | Japan . |
| 4309414 | 11/1992 | Japan . |
| 9109696 | 7/1991 | WIPO . |
| 9503901 | 2/1995 | WIPO . |

OTHER PUBLICATIONS

Patent Abstracts of Japan, vol. 017, No. 126, Mar. 17, 1993, & JP-A-04 309 414.
Patent Abstracts of Japan, vol. 015, No. 298, Jul. 29, 1991, & JP-A-03 110 022.
Patent Abstracts of Japan, vol. 015, No. 298, Jul. 29, 1991, & JP-A-03 110 018.
Patent Abstracts of Japan, vol. 018, No. 239, May 9, 1994, & JP-A-06 031 345.
Patent Abstracts of Japan, vol. 015, No. 325, Aug. 19, 1991, & JP-A-03 124 318.
Ichikawa et al., Y., "A Heuristic Planner and an Executive for Mobile Robor Control", *IEEE Transactions on Systems, Man and Cybernetics*, vol. SMC–15, No. 4, pp. 558–563, New York, U.S.A. (Jul./Aug. 1985).

(List continued on next page.)

*Primary Examiner*—George B. Davis
*Attorney, Agent, or Firm*—Greenblum & Bernstein P.L.C.

[57] ABSTRACT

A computerized method/system is provided for planning motion of a robot within a free space confined by obstacles, from an initial position to a goal position. In executing the method/system, a plan is generated so that the robot can hold and maneuver a workpiece throughout a sequence of bending operations to be performed by a bending apparatus. A plurality of proposed movements to be made by the robot are proposed for an mth movement within a sequence of movements, and at least a portion of the robot and the obstacles that confine the free space are modeled. A determination is made as to whether a collision will occur between the robot and an obstacle for each proposed movement, and a plan is generated including the sequence of movements by choosing for each movement in the sequence of movements, a proposed movement that will not result in a collision and that will bring the robot closer to the goal position. In choosing proposed movements, an estimated cost associated with each proposed movement may be taken into account. The estimated cost may be based upon a euclidian distance to the goal position from the position of the robot after the particular proposed movement is made as the mth movement, and/or the estimated cost may be determined as a function of the robot travel time from an (m−1)th movement to the mth movement. Different methods are provided for performing fine motion planning and gross motion planning.

66 Claims, 33 Drawing Sheets

OTHER PUBLICATIONS

Zussman et al., E., "A Planning Approach for Robot–Assisted Multiple–Bent Profile Handling", *Robotics and Computer–Integrated Manufacturing,* vol. 11, No. 1 pp. 35–40, Kidlington, Oxford, GB (March 1994).

Huang et al., H., "Time–Optimal Control for a Robotic Contour Follwing Problem", *IEEE Journal of Robotics and Automation,* vol. 4, No. 2, pp. 140–149, New York, U.S.A. (Apri. 1988).

Hoermann, K., "A Cartesian Approach to Findpath for Industrial Robots", *Nato ASI Series,* vol. F29, pp. 425–450, Springler–Verlag Berlin Heidelberg, DE (1987).

Fink et al., B., "Schnelle Bahnplanung Fuer Industrieroboter Mit Veraenderlichem Arbeitsraum", *Automatisierungstechinik–At,* vol. 39, No. 6, pp. 197–200, 201–204, Munich, DE (Jun. 1991).

Shaffer et al., C.A., "A Real–Time Robot Arm Collision Avoidance System", *IEEE Transactions on Robotics and Automation,* vol. 8, No. 2, pp. 149–160, New York, U.S.A. (Apr. 1992).

Lee et al., C.T. "A Divided–And–Conquer Approach With Heuristics of Motion Planning for a Cartesian Manipulator", *IEEE Transactions on Systems, Man and Cybernetics,* vol. 22, No. 5, pp. 929–944, New York U.S.A. (Sep./Oct. 1992).

O'Donnell et al., P.A., "Deadlock–Free and Collision–Free Coordination of Two Robot manipulators", *Proceedings of the 1989 IEEE International Conference on Robotics and Automation,* vol. 1, pp. 484–489, Scottsdale, AZ (May 1989).

Weule et al., V.H., "Rechnerintergrierte Fertigung Von Abkantteilen"*V.A.I.–Zeitschrift,* vol. 130, No. 9 pp. 101–106, Dusseldorf, W. Germany (Sep. 1988).

Reissner, V.J., "Innovationsschub Bei Rechnerintegrierten Umformsystemen", *Technische Rundschau,* vol. 85 No. 5, pp. 20–25, Bern, CH (Feb. 5, 1993).

Geiger et al., M., "Inferenzmaschine Fuer Ein Biegestadienplanungssystem", *Zwf Cim Zeitschrift Fur Wirtschaftliche Fertigung Und Automatisierung,* vol. 87, No. 5, pp. 261–264, Munich, DE (May 1992).

Database Dialog, Information Access Co., file 621, Access No. 0134529, *Communigraphics Inc;* "LVD Introduces New CNC/DNC/CAD/CAM Control System for Press Brakes at IMTS'86", & New Product Announcements, No. 0134529, Plainville, CT, U.S.A. (Jul. 1996).

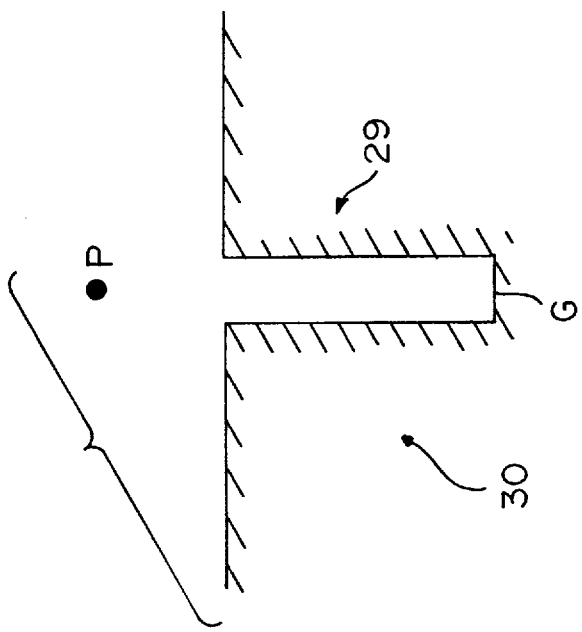
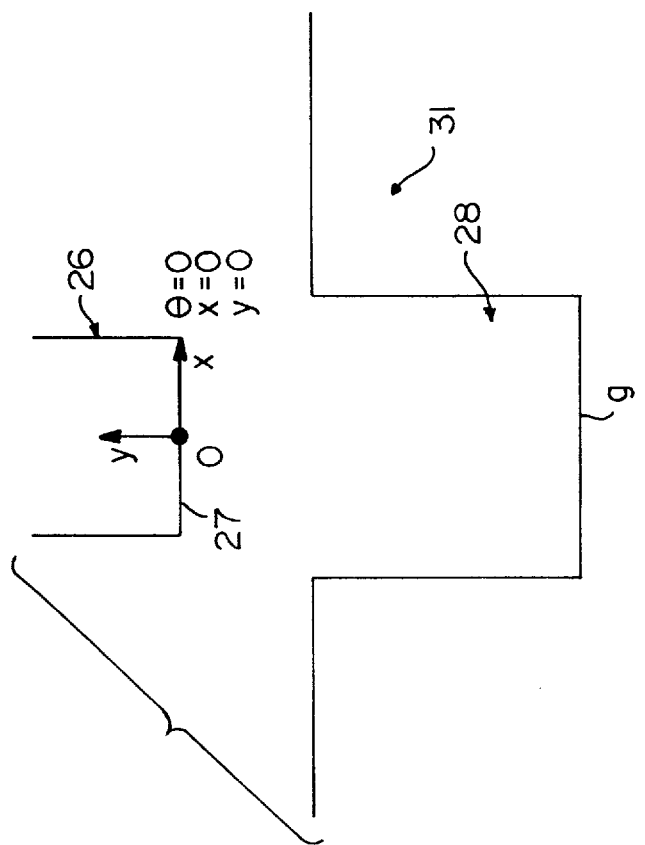
FIG. 2B PRIOR ART
FIG. 2A PRIOR ART

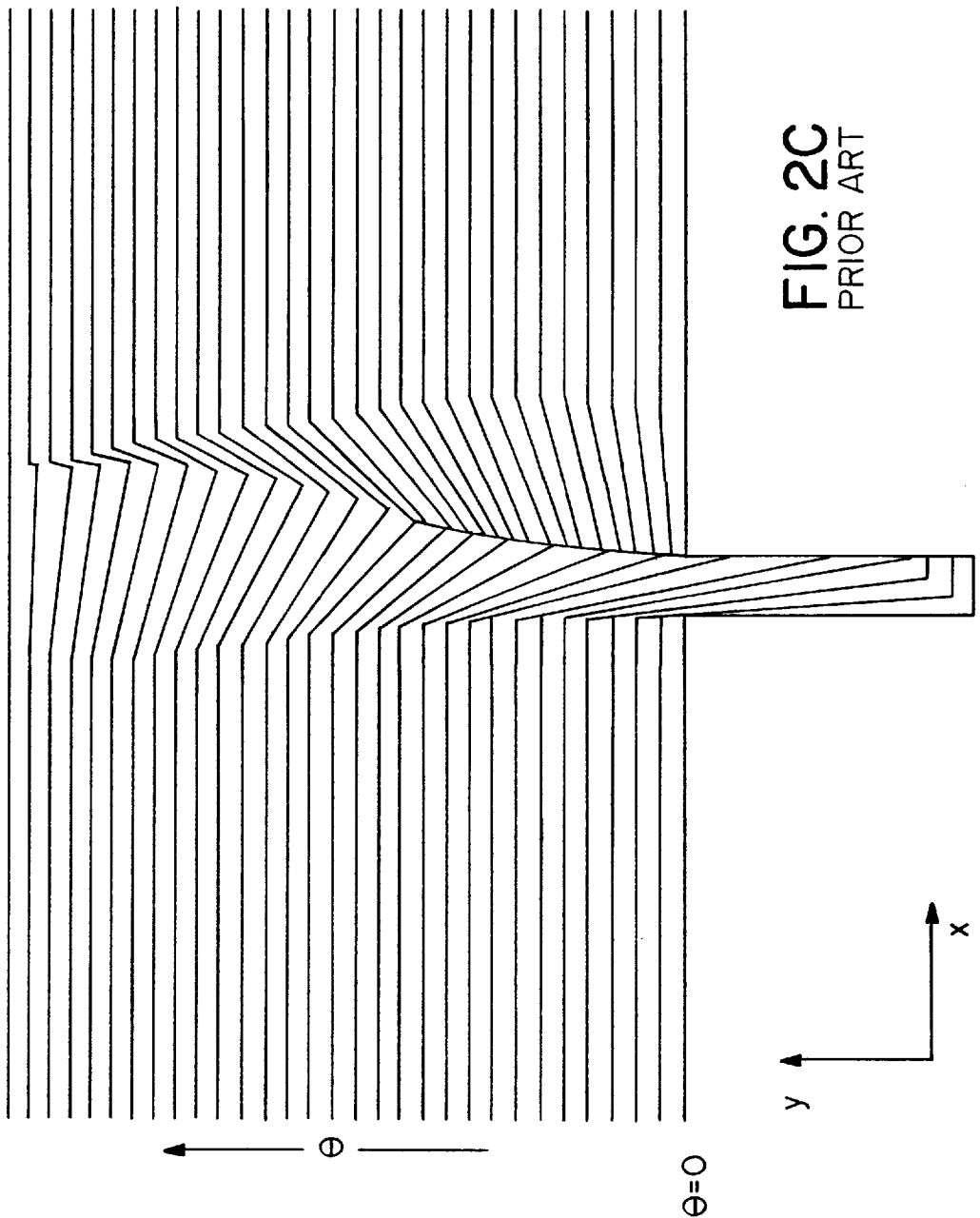

GROSS MOTION MOVEMENTS
- MOVE +/-90° IN PITCH AND YAW
- MOVE +/-90° IN PITCH
- TRANSLATE TO ONE OF EIGHT
  CORNERS OF A CURRENT CHANNEL
  (OVERLAPPING/MAXIMAL PARALLELOPIPED)
- TRANSLATE TO GOAL IF W/IN
  CURRENT CHANNEL AND SUCH
  TRANSLATION IS POSSIBLE
- MOVE X COMPONENT TO GOAL
- MOVE Y COMPONENT TO GOAL
- MOVE Z COMPONENT TO GOAL

FIG. 12C

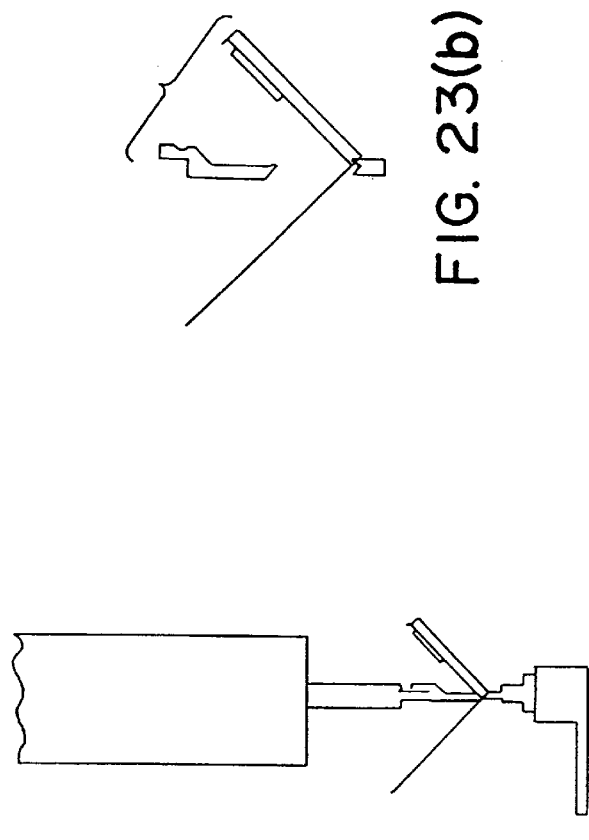
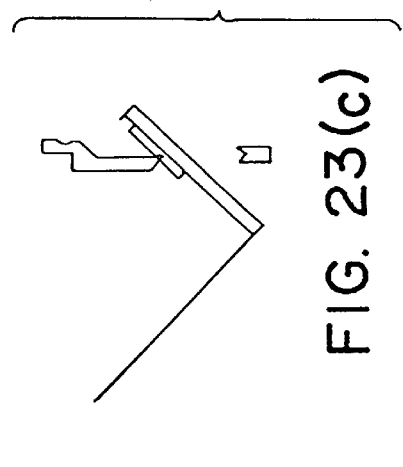
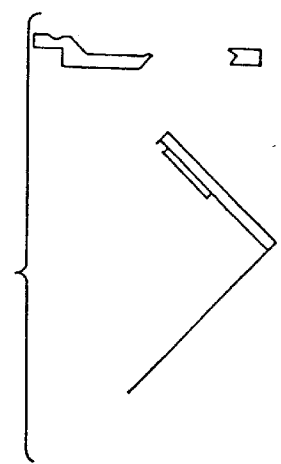
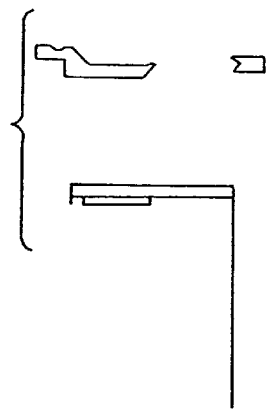

METHOD FOR PLANNING/CONTROLLING ROBOT MOTION

BACKGROUND OF THE INVENTION

1. Copyright Notice

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

2. Related Application Data

The present disclosure is related to the disclosures provided in the following U.S. applications filed on even date herewith: "Intelligent System for Generating and Executing a Sheet Metal Bending Plan," filed in the names of David Alan Bourne et al. (U.S. application Ser. No. 08/338,113); "Methods and Apparatuses for Backgaging and Sensor-Based Control of Bending Operations," filed in the names of Richard M. Moore, Jr. et al. (U.S. application Ser. No. 08/338,153); and "Fingerpad Force Sensing System," filed in the names of Anne M. Murray et al. (U.S. application Ser. No. 08/338,095). The contents of each of these related applications are expressly incorporated by reference herein in their entireties.

3. Field of the Invention

The present invention relates to methods for planning/controlling the motion of a robot, and various systems and sub-components related to the operation thereof.

4. Discussion of Background Information

Various methods have been disclosed in the literature for providing a geometric model of the "amount of free space" a robot has to move within, and for producing a motion plan for the robot to move from a start position to a goal position within the free space. Approximate decomposition methods are among such methods for modeling a robot's free space, as disclosed by Jean-Claude Latombe in "Robot Motion Planning," Kluwer Academic Publishers, Boston/Dordrecht/London (1991), the content of which is expressly incorporated herein by reference in its entirety. Approximate cell decomposition may be utilized to determine the amount of free space in a given physical environment. In some such methods, a rectangloid (i.e., a rectangle or parallelepiped) decomposition P is formed of $\Omega = Cl(\Re)$, which is a rectangloid of $\Re^m$, where m is the dimension of the configuration space. The resulting rectangloid decomposition P is utilized to search for a solution path connecting a start position $Q_{init}$ to a goal position $Q_{goal}$. An algorithm that may be utilized to find the solution path is as follows:

(1) An initial rectangloid decomposition $P_1$ of a rectangloid $\Omega$ within $\Re$ is computed, and cells are thus produced, each of which is classified as: empty, if it does not intersect a C-obstacle region; full, if it is entirely contained in a C-obstacle region; and mixed if it partially intersects a C-obstacle region.

(2) The resulting decomposition $P_i$ is searched in order to obtain a channel that connects the initial cell containing $Q_{init}$ to the goal cell containing $Q_{goal}$. The channel may either be an E-channel, comprising all empty cells, or an M-channel, comprising one or more mixed cells. If the outcome of the search is an E-channel, the algorithm will return with the free-space empty cell E-channel. If, however, the outcome of the search is an M-channel, the process will proceed to step (3) below. Otherwise, the algorithm will return with failure.

(3) For every mixed cell within a generated M-channel, a further rectangloid decomposition $P_i$ will be computed, and the process will return to step (2).

In computing a rectangloid decomposition of a MIXED cell, a divide-and-label method may be performed, as illustrated in FIG. 1. The method comprises the steps of first dividing a cell into smaller cells, as illustrated in FIG. 1, and then labeling each newly created cell according to whether it intersects a C-obstacle region. A widely used technique for decomposing a rectangloid $\Omega$ into smaller rectangloids is to compute a $2^m$-tree decomposition. In a $2^m$-tree decomposition, a tree is formed having nodes, each of which represents a rectangloid cell which is labeled as either EMPTY, FULL or MIXED. The root node of the tree is $\Omega$. Each node which represents a MIXED cell will then be decomposed to form $2^m$ children nodes. Each child of a parent cell has the same dimensions, and is formed by dividing each edge of the parent cell into two segments of equal length. If m=3, the tree is called an octree.

FIG. 1 shows an octree decomposition of a parallelepiped representation 10 of a portion of configuration space, and displays a portion of an octree graph 12. The overall height h of the tree (i.e., the depth of the deepest node) determines the resolution of the decomposition, and hence the size of the smallest cells in the decomposition. A maximum height $h_{max}$ of the tree may be specified to thereby limit the iterative process carried out by steps 2 and 3 of the algorithm noted above.

It is noted that octree graph 12 does not correspond precisely to the parallelepiped 10 depicted in FIG. 1. Rather, the various rectangloids depicted in octree graph 12 are chosen randomly in order to simplify the illustration.

The above described approximate cell decomposition method utilizes a configuration space approach to spatial planning, whereby the position and orientation of an object A in relation to obstacles B is characterized as a single point in a configuration space, in which the coordinates of the point represent a degree of freedom of the object in relation to the obstacles. The configurations (i.e., the placements) forbidden to the object A, due to the presence of other objects/obstacles, are characterized as regions in the configuration space, called configuration space obstacles (C-obstacles). Much literature has been published concerning the use of a configuration-space representations of an object with respect to obstacles, including a paper by Tomas Lozano-Perez, entitled "Spatial Planning: A Configuration Space Approach", IEEE Transactions on Computers, Vol. C-32, No. 2 (February 1983), the content of which is expressly incorporated by reference herein in its entirety. This paper presents several algorithms for computing configuration space obstacles formed by objects which are polygons or polyhedra.

FIG. 2A illustrates a two-dimensional representation of a peg 26 and a hole 28, wherein the goal is to place peg 26 within hole 28, so that a bottom surface 27 of peg 26 makes flush contact with a bottom surface g of hole 28. The position and orientation of peg 26 may be represented in two-dimensional euclidian space as a set of Cartesian coordinates $(x, y, \theta)$, the origin of which is positioned at the center of bottom surface 27 of peg 26. At the location illustrated in FIG. 2A, peg 26 will have the coordinates $\theta=0$, $x=0$, and $y=0$.

FIG. 2B illustrates a configuration space representation of the real-space problem of FIG. 2A. A point P is shown in its initial position (as shown in FIG. 2B) and may be moved to any position along a portion G of C-surface 29. C-surface 29 represents a C-obstacle 30 that corresponds to an obstacle (hole) 31 represented in real-space in FIG. 2A, and point P represents peg 26.

The position of P determines the position of peg 26 in relation to hole 28. The boundary of the shaded area shown in FIG. 2B represents the positions at which peg 26 would be in contact with obstacle 31, if point P was along the boundary. The transformation from FIG. 2A to FIG. 2B amounts to shrinking the peg 26 to a point P, and expanding obstacle 31 to form a C-obstacle 30. The transformation from FIG. 2A to FIG. 2B is a limited example of how one may reformulate a problem of moving a rigid object among other rigid objects as an equivalent problem of moving a point among transformed objects in a higher-dimensional space called the configuration space (C-space).

It is noted that FIG. 2B corresponds to the points at which peg 26 will collide with obstacle 31, if the axes (x,y) of peg 26 and hole 28 are constrained to be parallel, thereby keeping $\theta$ equal to 0.

FIG. 2C illustrates how the C-surface changes as the orientation of peg 26, with respect to hole 28, changes, i.e., as $\theta$ increases from 0 by rotating the orientation of peg 26 in a counter-clockwise direction. FIG. 2C thus shows in a three-dimensional C-space (x,y,$\theta$) the configurations of peg 26 with respect to hole 28. In this space, hole 28 is defined as a C-obstacle. The lines illustrated in FIG. 2C represent surfaces at which some surface of peg 26 is just touching a surface of hole 28.

Another approach to motion planning may be utilized by which the configuration is discretized into a fine regular grid of configurations, and is then searched for a free path from an initial position $Q_{init}$ to a goal location $Q_{goal}$. In searching the grid for a free path, several types of heuristics have been proposed. Latombe notes in "Robot Motion Planning" (1991) that the most successful types of heuristics, for searching a fine regular grid of configurations for a free path, include the use of functions that are interpreted as "potential fields". The functions are called "potential fields" because the robot is represented as a point in configuration space which can be viewed as a particle moving under the influence of an artificial potential produced by the goal configuration (i.e., the point within the configuration space at which the point representing the robot will be at the goal) and the C-obstacles. Typically, the goal configuration generates an "attractive potential" which pulls the robot toward the goal, and the C-obstacles produce a "repulsive potential" which pushes the robot away from them. The direction of the resulting force is considered to be the most promising direction of motion.

In industry, in order to plan the gross motion of a robot which will be utilized to implement a particular process step, the robot is "walked through" the needed movements to bring the robot from a starting position to a goal position. Automated gross motion planning systems may be utilized to simulate the movement of the robot on a computer. However, in industry, automatically generated robot motion plans are seldom (if ever) used because the accuracy of such plans is not trusted and/or because the algorithms used to generate such plans are complicated and time-consuming.

In academics, many sophisticated automated robot motion planning algorithms have been proposed. However, a common focus in academia is to obtain optimal results, i.e., to generate a robot motion plan that moves the robot along the most efficient path from an initial position to a goal position. Since such methods concentrate on the obtention of optimal results, the resulting algorithms tend to be complicated and time-consuming.

5. Definitions

For purposes of clarification, and to assist readers in an understanding of the present invention, a number of terms used herein are defined as follows:

Bending Apparatus/Bending Workstation—a workstation or apparatus for performing modern sheet metal working functions, including bend operations.

Bending Sheets of Malleable Material—working of sheets of malleable material, such as sheet metal, including, but not limited to, up-action air bending, V bending, R bending, hemming, seaming, coining, bottoming, forming, wiping, folding type bending, custom bending and so on.

Maximal overlapping Rectangloid—a rectangloid with its sides expanded in each orthogonal direction to the maximum possible location within a defined free space, such as described below in the text corresponding to FIG. 11D.

m-Tree Representation of a Work Space—a decomposition of a rectangloid representative of a work space into smaller rectangloids, such decomposition being utilized to represent which portions of the work space rectangloid are empty, full, or mixed. The resulting decomposition being defined in terms of a tree. An example of an octree representation of a work space, which is a type of m-tree representation, is given in FIG. 1 and FIGS. 11A and 11B.

Rectangloid—a rectangle in a two-dimensional space, or a parallelepiped in a three-dimensional space.

SUMMARY OF THE INVENTION

In view of the above, the present invention, through one or more of its various aspects and/or embodiments, is thus presented to bring about one or more objects and advantages, such as those noted below.

It is an object of the present invention to provide a computer-implemented robot motion planner for planning the motion of a robot within an industrial environment such as within a sheet metal bending work station. It is an object of the present invention to provide such a gross motion planning system which generates a motion plan in an efficient and timely manner, without excessively infringing upon the computer's resources, such as memory.

It is a further object of the present invention to provide an automated intelligent motion planning system. The motion planning system may be provided with one or more mechanisms for adjusting the optimal nature of the resulting motion path for the robot so that, depending on the circumstances, an optimal, more refined computation method will be utilized, or a cruder but faster computation method will be utilized, in order to produce a motion path.

It is a further object of the present invention to provide mechanisms for modeling the relevant Euclidean space of the environment within which the robot is placed, the mechanism utilizing a small amount of memory space to fully represent the Euclidean space, and being configured to accurately represent the Euclidean space with a sufficient amount of resolution so that the system will be able to operate efficiently, and without the occurrence of collisions between the robot and any physical components.

It is a further object of the present invention to provide a motion planning system having a collision checking procedure which can be performed in order to determine if a collision will likely result by simulating movement of the robot in accordance with the generated motion plan. If a collision will likely occur based upon collision checking, the plan may then be modified accordingly.

It is a further object of the present invention to provide a motion planning system which interacts with, and thereby helps, other systems and subsystems in the development of a sequence plan. The motion planning system provides incremental advice to a sequence planning system in order to guide the planning process. The advice is provided in terms of explicit costs and parameters that may be used to program the final robot motion. The motion planning system also serves as a guide for various subsystems which work together with the sequence planning system to create a plan toward a final goal. The subsystems can query the motion planning system about costs and parameters associated with a particular proposed motion, and use the information provided by the motion planning system in order to development several subplans. A motion planning system of this type is in contrast from other motion planning systems that are essentially stand-alone motion planners. Such stand-along motion planners do not provide advice to other systems and subsystems about the costs and parameters associated with various moves.

The present invention, therefore, is directed to various methods and systems, including a computerized method for planning motion of a robot within free space, the free space being confined by obstacles, and the motion being planned from an initial position to a goal position. A plurality of proposed movements are proposed for an mth movement within a sequence of movements to be made by the robot. At least a portion of the robot and the obstacles that confine the free space are modeled, and a determination is made as to whether a collision will occur between the robot and an obstacle for a proposed movement being executed as the mth movement. A plan is then generated, including the sequence of movements, by choosing, for each movement in the sequence of movements, a proposed movement that will not result in a collision and that will bring the robot closer to the goal position. The robot may comprise a robot for holding and maneuvering a workpiece through a sequence of bending operations to be performed by a bending apparatus.

In accordance with a particular aspect of the present invention, the method may further include a step of estimating a cost to be associated with each proposed movement, whereby the generating step comprises choosing, for each movement in the sequence of movements, a proposed movement that will not result in a collision, that will bring the robot closer to the goal position, and that has a lowest/lower estimated cost. The estimated cost for a particular proposed movement may include a Euclidian distance to the goal position from the position of the robot after the particular proposed movement is made as the mth movement. In addition, or in the alternative, the estimated cost for a particular proposed movement may comprise an estimated value indicative of the robot travel time to move from a position after an (m−1)th movement to a position of the robot after the particular proposed movement is made (for the mth movement).

Additional steps may be provided before the proposing step, such additional steps including specifying a plurality of movements in C-space for an mth movement in the sequence of movements, and identifying which ones of the specified plurality of movements are feasible by performing collision checking. The proposing step may then include proposing movements from among the movements identified as feasible. In addition, the specified plurality of movements specified for an mth movement in the sequence of movements may include a plurality of movements in directions which collectively surround the position at which the robot is after the (m−1)th movement in the sequence of movements. The specified plurality of movements for an mth movement in the sequence of movements may also comprise movements in a plurality of intelligent movement directions. In this regard, the method may be designed so that it plans the motion of the robot in order to unload a malleable workpiece from a tooling punch of a bending apparatus after completing a bend. The intelligent directions may comprise a downward movement of the robot causing the workpiece to move downward. In addition, or in the alternative, the intelligent directions may comprise a backward movement of the robot causing the workpiece to be backed out of the bending apparatus. An additional type of intelligent direction may include moving the robot to thereby cause the workpiece to change in pitch from an inclined position towards a horizontal position.

The method may further include the steps of forming an m-tree representation of a work space of the robot and computing maximal overlapping rectangloids (forming channels) within the free space of the m-tree representation of the work space. The m-tree representation may be an octree representation, and the maximal overlapping rectangloids may comprise maximal overlapping parallelepipeds.

The proposing step may include proposing, for an mth movement, a set of movements of the robot to locations that fall within a maximal overlapping rectangloid within which the robot is located immediately after an (m−1)th movement of the sequence of movements. In this regard, the set of movements may include translating the robot to any one of eight corners of the present maximal overlapping rectangloid, and moving the robot along any one of a plurality of predetermined axes/directions which bring the robot to a position along a predetermined axis/direction coincides with the goal position.

In accordance with an additional aspect of the invention, the set of movements may comprise moving the robot in a first of three orthogonal directions to a position along the first orthogonal direction which corresponds to the goal position; moving the robot in a second of the three orthogonal directions to a position along the second orthogonal direction which corresponds to the goal position; moving the robot in a third of the three orthogonal directions to a position along the third orthogonal direction which corresponds to the goal position; moving the robot in order to adjust a pitch of a gripper of the robot; and/or moving the robot in order to adjust both the pitch and yaw of the gripper of the robot.

In accordance with yet a further aspect of the present invention, the set of movements, from which movements may be proposed (for generation of the motion plan from the initial position to the goal position), may include moving along one of a plurality of orthogonal directions only when such movement would bring the robot to an orthogonal position that corresponds to the goal position.

In accordance with a further aspect of the present invention, the method may further include fine motion planning for planning a plurality of free-space fine motion solution paths that extend between a plurality of respective pairs of positions, $q_i$, and $q_g$. The method may also comprise gross motion planning for planning a plurality of free-space gross motion solution paths that extend between a plurality of respective pairs of positions, $Q_i$ and $Q_g$. The fine motion planning may comprise performing the above-noted steps of proposing, modeling, determining and generating, for each pair of positions, $q_i$ and $q_g$. In this regard, the proposing step may comprise specifying a plurality of movements in C-space for the mth movement and identifying which ones of the specified plurality of movements are feasible by performing collision checking. The gross motion planning may comprise performing the steps of proposing, modeling, determining and generating for each pair of positions, $Q_i$ and $Q_g$. The proposing step may comprise proposing a set of movements within a maximal overlapping parallelepiped within the free space of the robot.

In accordance with an additional aspect of the present invention, the method may calculate whether the simple collision-free path can be determined, and form a plan including movements for traversing the simple collision-free path. If a simple collision-free path can be determined, the method may inhibit operation of the steps of proposing, determining, and generating, since such time-consuming steps are unnecessary in view of the already formed simple collision-free path.

The above-listed and other objects, features, and advantages of the present invention will be more fully set forth hereinafter.

BRIEF DESCRIPTION OF THE DRAWINGS

The present invention is further described in the detailed description which follows, by reference to a plurality of drawings by way of non-limiting examples of illustrated embodiments of the present invention, in which like reference numerals represent similar parts throughout the several views of the drawings, and wherein:

FIG. 2A illustrates a 2D (two-dimensional) Euclidian space representation of a peg-in-hole problem;

FIG. 2B illustrates a configuration space (C-space) representation of the peg-in-hole problem illustrated in FIG. 2A, with θ fixed;

FIG. 2C illustrates a configuration space representation of the peg-in-hole problem with θ varied;

FIG. 12C illustrates a set of gross motion movements to be utilized for consideration as successor nodes in the search performed by the gross motion planning method;

DETAILED DESCRIPTION OF THE ILLUSTRATED EMBODIMENTS

Figure 1:
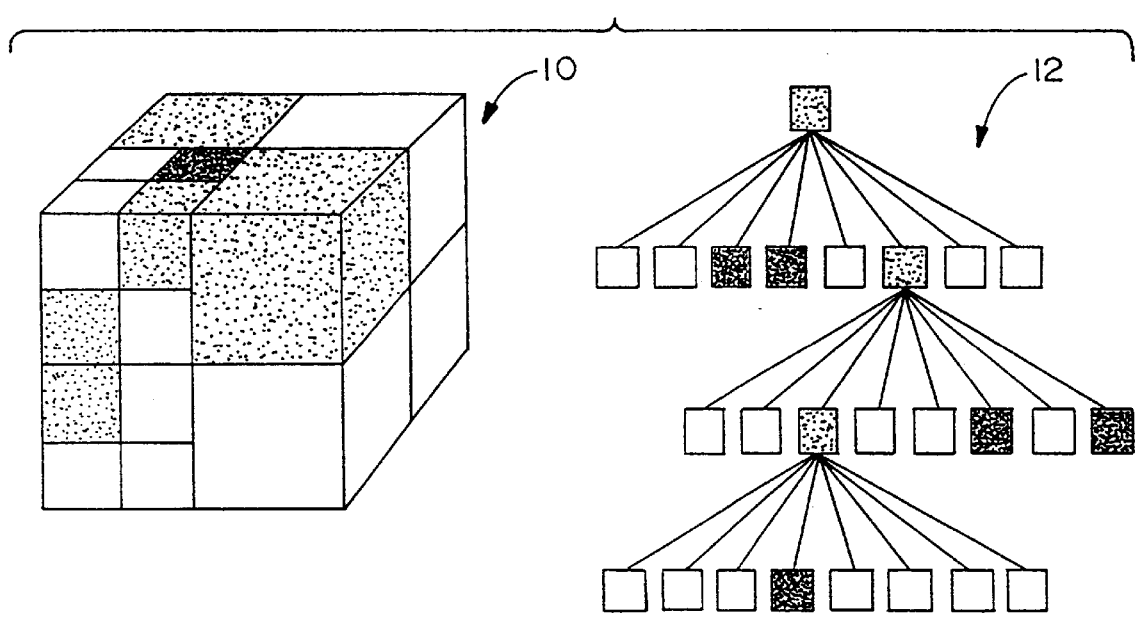
FIG. 1 illustrates a graphic representation of a parallelepiped decomposition of a work space and a corresponding octree graph of the decomposition.
Figure 3:
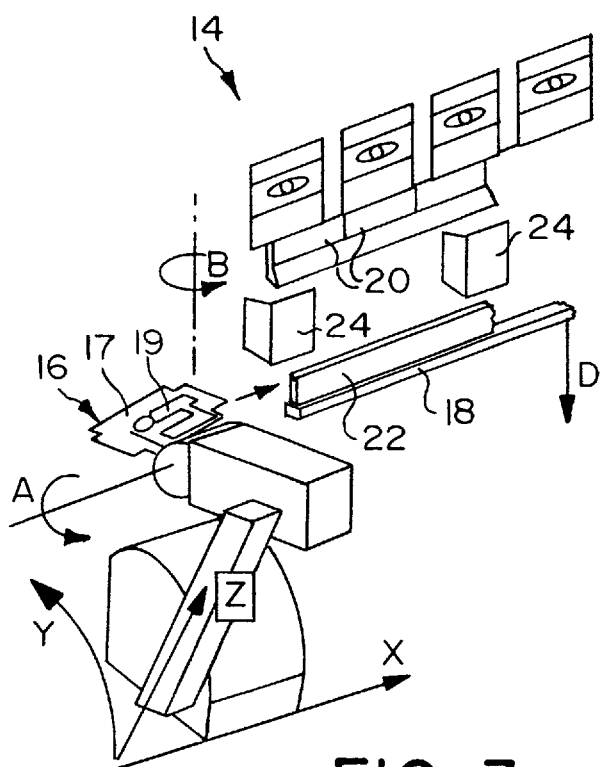
FIG. 3 illustrates a partial simplified elevated perspective view of a press of a bending apparatus.

Referring now to the drawings in greater detail, FIG. 3 illustrates a portion of a press brake 14 of a sheet metal bending work station and a robotic manipulator (robot) 16. As shown in FIG. 3, press brake 14 includes several components, such as a die rail 18, at least one die 22, at least one punch tool 20, and a backgaging mechanism 24. In operation of press brake 14, a piece of sheet metal (i.e., a sheet metal workpiece) 17 is manipulated by robot 16 and placed in the die space formed between punch tool 20 and die 22, and die rail 18 is driven upward to cause punch tool 20 and die 22 to concurrently engage the sheet metal workpiece. This causes sheet metal workpiece 17 to bend in conformance with the respective complimentary operating surfaces of punch tool 20 and die 22. Robot 16 and press brake 14, as illustrated in FIG. 3, provide a basis with which to describe a system for planning robot motion and a system for controlling robot motion, by showing an exemplary environment within which such systems may be utilized. In this regard, it is noted that the robot planning and control systems of the present invention may be utilized with an intelligent system for generating and executing a sheet metal bending plan such as that disclosed in the above-noted commonly assigned application, filed on even date herewith in the names of David Alan Bourne et al., entitled "An Intelligent System for Generating and Executing a Sheet Metal Bending Plan" (U.S. application Ser. No. 08/338,113).

Figure 4:
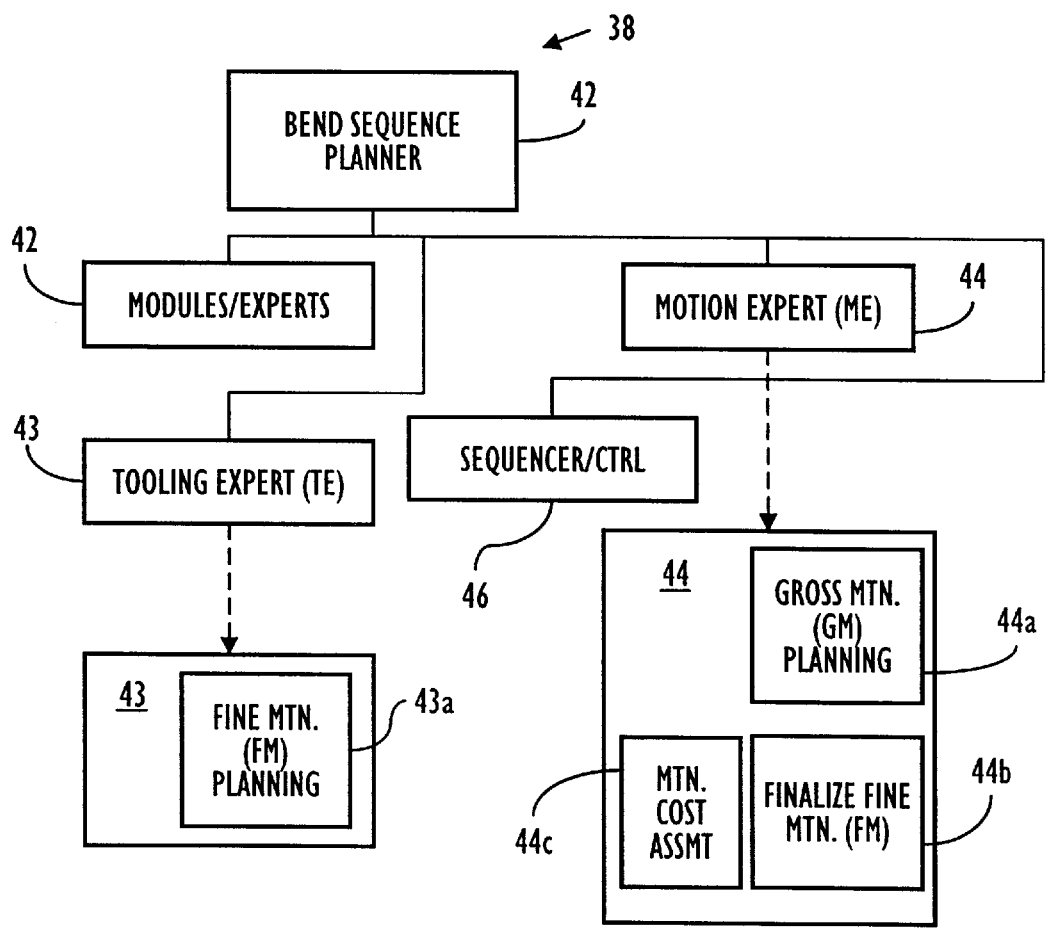
FIG. 4 comprises a block diagram of a planning and control system of a bending apparatus.

FIG. 4 illustrates a partial block diagram of a planning/control system for generating a bending plan and for controlling operation of a sheet metal bending work station in accordance with the generated plan. The illustrated system may be implemented in accordance with the system disclosed in the above-noted commonly assigned patent applications (U.S. application Ser Nos. 08/338,113 and 08/358,153). As shown in FIG. 4, the planning/control system includes a bend sequence planner 40, several modules/experts 42, a tooling expert 43, a motion expert 44, and a sequencer/controller 46. Planner 40 operates in cooperation with each of modules/experts 42, along with tooling expert 43 and motion expert 44, to produce a plan for the complete part production of a bent sheet metal workpiece to be executed by a bending work station 14 such as that shown in FIG. 3. Bend sequence planner 40 generates a final plan (which includes a general list of steps and accompanying information needed to control the operation of various hardware elements of the system) and forwards the generated plan to sequencer/controller 46.

In generating a complete plan, which includes a complete sequence of bends to be performed on a workpiece, bend sequence planner 40 participates in a dialogue with each of modules/experts 42, tooling expert 43, and motion expert 44. Bend sequence planner 40 queries each expert for subplan and cost information which will assist planner 40 in making decisions as to which bends and operations should make up the final generated plan which will be forwarded to sequencer/controller 46. Bend sequence planner 40 queries tooling expert 43 for information such as the stage that would be utilized to perform a particular bend in a bend sequence and the location on the stage at which the workpiece should be loaded in order to perform the bend. In addition, planner 40 queries tooling expert 43 for information including estimated k and h costs, and fine motion planning information. Tooling expert 43 then responds to the planner's queries with the k and h costs and various subplan information. The fine motion planning module is provided (in the illustrated embodiment) in tooling expert 43 since fine motion planning depends upon the type of tooling that will be utilized in performing the bends of the bend sequence.

The motion planning system of the present invention, as implemented in the embodiment illustrated in FIG. 4, generates two separate plans: a gross motion plan for navigating the robot (and other parts of the system) in free space, and a fine motion plan for navigating the robot (and workpiece which is being held by the robot) when there is contact or potential contact between one or more components of the bending workstation (usually a punch tool and die) and robot 16 or workpiece 17.

Bend sequence planner 40 queries motion expert 44 for information including the k and h costs associated with a particular bend in a sequence of bends being generated by the bend sequence planner. In addition, bend sequence planner 40 queries motion expert 44 for information concerning the gross motion plan, which involves navigating the robot from one point within the overall work space of the bending apparatus to another, e.g., from a loading position of the bending apparatus to a position ready for loading into the die space at a first tooling stage of the bending apparatus. Bend sequence planner 40 instructs motion expert 44 to perform, among other functions, a fine motion integration function which includes integrating the gross motion plans with the fine motion plans that were generated by tooling expert 43.

Tooling expert 43 includes a plurality of modules for performing its functions, including, e.g., fine motion planning module 43a which is shown in the box pointed to by the dotted arrow. Motion expert 44 includes a plurality of modules, including several modules for performing motion planning. For example, motion expert 44 includes gross motion planning module 44a, a finalize fine motion module 44b, and a motion cost assignment module 44c. Motion cost assignment module 44c is utilized primarily to generate the appropriate k and h costs which can be utilized by bend sequence planner 40 to decide whether or not one or more particular bend-related operations will be utilized at a particular operation within a sequence of operations being generated.

Figure 5:
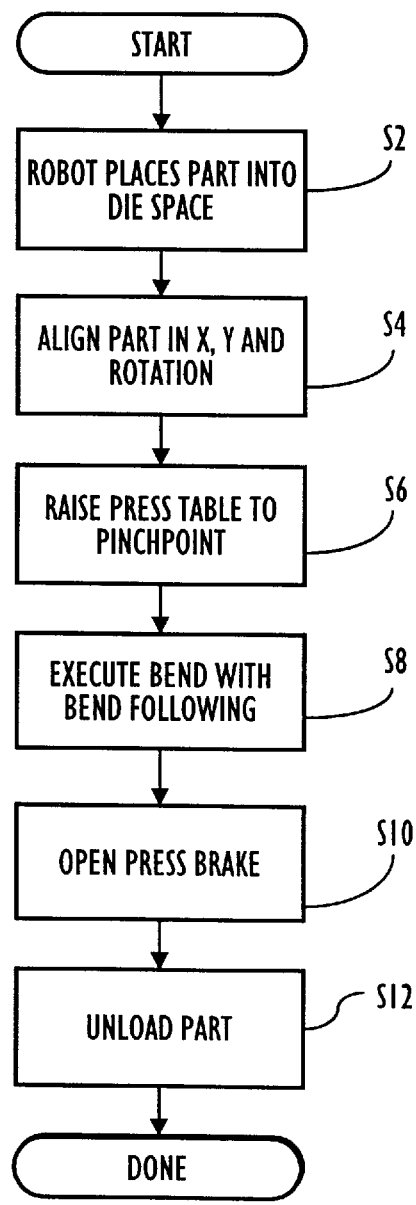
FIG. 5 is a flow chart of an overall bending process.

FIG. 5 is a flow chart which illustrates a general process of performing a bend with a sheet metal bending workstation/bending apparatus such as the one illustrated in FIG. 3 herein. In a first step S2, the robot 16 places a part/workpiece 17 into the die space. Then, at step S4, the part is aligned in several directions, including an X direction, a Y direction and a rotation (yaw) direction. In step S6, the press table is raised until it reaches the pinch point (a point at which the die braces the workpiece against the tooling punch). Then, at step S8, the bend is executed with bend following (i.e., with the robot maintaining its firm hold on the workpiece throughout execution of the bend). Once the bend is performed, in step S10, the press brake is opened. In step S12, the part is unloaded from the bending apparatus, by removing the part from the die space.

Figure 6:
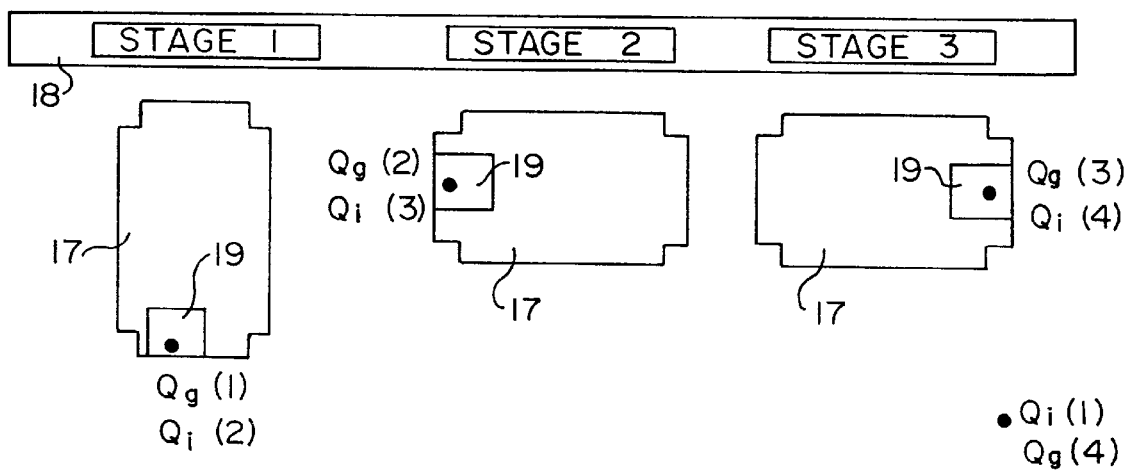
FIG. 6 is an elevated top view of a workpiece as it being positioned for loading at several stages along a die rail of a bending apparatus.

FIG. 6 provides an illustration of several starting positions $Q_i$ and goal positions $Q_g$ through which a workpiece 17, being held by a robot gripper 19, may be moved throughout execution of a bending sequence. The illustrated starting positions $Q_i$ and goal positions $Q_g$ form starting and goal position pairs that form a gross motion path which is to be generated by the illustrated gross motion planner. The bend sequence may include various bends to be performed on several stages, including the illustrated stages, which include stage 1, stage 2, and stage 3, each of which is placed along a die rail 18. Each of the starting and finishing positions $Q_i$ and $Q_g$ (between which a gross motion path will be planned) are starting and finishing positions for which solutions will be generated by gross motion planner 44a provided within motion expert 44 of the embodiment illustrated in FIG. 4.

A description of the sequence of movements, with reference to FIG. 6, will help illustrate the relationship between the gross motion and fine motion planning algorithms of the illustrated embodiment. Initially, robot 16 (not shown in FIG. 6) will retrieve workpiece 17 from an initial position $Q_i(1)$ from the loader/unloader (not shown) of the bending apparatus. The initial starting position from which the motion planner (e.g., gross motion planning module 44a) will plan a (gross motion) solution path extending to stage 1, at position $Q_g(1)$. Once the workpiece is at the location defined by $Q_g(1)$, final motion planning will be utilized to plan the motion of workpiece 17 which will be used to load the workpiece into the die space, i.e., the space between the punch tool and die so that a bend may be performed. Once the bend is performed, fine motion planning module 42a will determine a solution path for unloading the workpiece, thus returning the workpiece to position $Q_i(2)$. This is the starting position for the next gross motion plan to be generated which will extend from stage 1 at position $Q_i(2)$ to stage 2 at $Q_g(2)$. Once at position $Q_g(2)$, a fine motion plan (which was generated by fine motion planning module 43a and integrated into the final overall motion plan) will be performed to generate a solution path for loading and unloading the workpiece into and out of the die space, the resulting position of workpiece 17 then corresponding to $Q_i(3)$ which is the starting point for a next portion of the overall plan (which is formed by a gross motion plan generated by gross motion planning module 43a), which is generated to take the robot and the workpiece from stage 2 to stage 3 at position $Q_g(3)$. A fine motion plan, which has been integrated into the overall plan, then is executed at this point in order to load and unload the workpiece into the die space at stage 3. The final portion of the overall integrated motion plan, which corresponds to the last gross motion plan that was generated, will extend from $Q_f(4)$ at stage 3 to the end position $Q_g(4)$, which corresponds to the position at which the workpiece is ready for retrieval by the loader/unloader (not shown).

Figure 7:
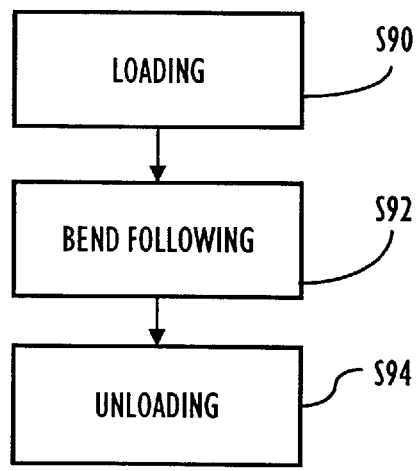
FIG. 7 is a flow chart illustrating the steps within a bending process that are incident to fine motion planning.

FIG. 7 is a flow chart of the steps within the bending process incident or relevant to fine motion planning. During each bend being performed by the bending apparatus, when the workpiece is ready, in step S90 it is loaded into the die space at a particular stage location. Then, in step S92, the bend is performed, with bend following. Finally, in step S94, after the bend is completed, the workpiece is unloaded from the die space, and then is ready for movement to the next stage location for a next bend, or for unloading from the bending apparatus with the use of a loader/unloader (not shown). As noted above with respect to FIG. 6, fine motion planning may be performed to plan the movement of the workpiece during either or both of loading the workpiece into the die space and unloading the workpiece into the die space.

FIG. 8 shows a plurality of side views of a workpiece 17 at different parts of a bend. View (a) shows workpiece 17 loaded into the die space. View (b) shows bend-following during the bend, corresponding to step S92 of the flow chart of FIG. 7. View (c) in FIG. 8 illustrates workpiece 17 as it is being unloaded from the die space, and corresponds to step S94 of the flow chart of FIG. 7.

Figure 8A:
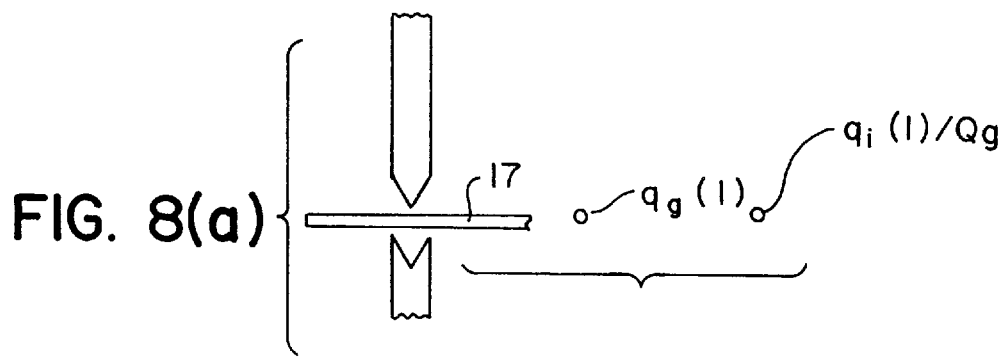
FIGS. 8(a), 8(b) and 8(c) illustrate several side views of a workpiece and its relationship to the punch tool and die of a bending apparatus during each of the steps illustrated in FIG. 7.
Figure 8B:
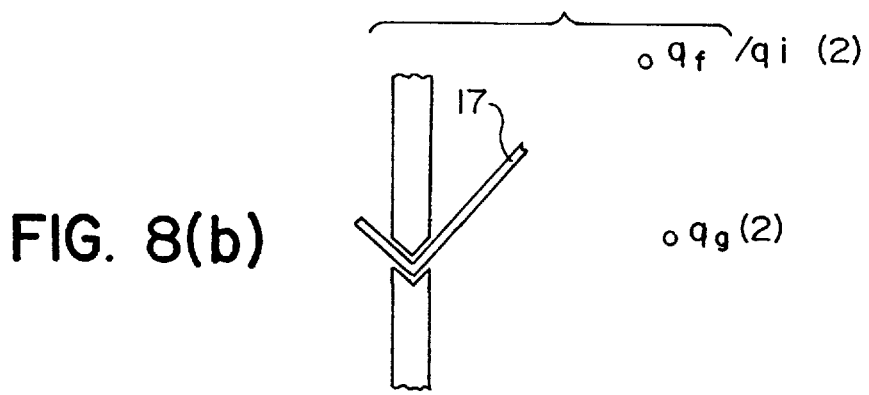
Figure 8C:
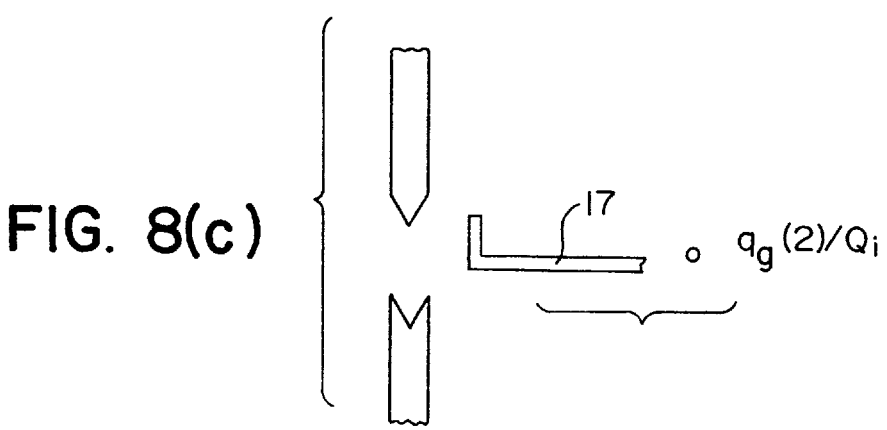

FIGS. 8(a)–8(c) illustrate the various fine motion plan portions of the overall integrated motion plan that would be utilized by sequencer/controller 46 to control movements of the workpiece throughout performance of several operations of the bending apparatus. Before the workpiece is loaded into the die space, workpiece 17 is located at an initial position $q_i(1)$ which coincides with a final gross motion plan position $Q_g$. A fine motion plan will be generated in order to generate a path taking the workpiece from the initial position $q_i(1)$ to a goal position $q_g(1)$ which is a loaded position of workpiece 17. The position $q_g(1)$ corresponds to an initial position of the workpiece before performance of a bend with bend-following. Bend following is then performed which results in moving the position of workpiece 17 (and also the position of the robot gripper which is holding the workpiece) to a position $q_f$. The position $q_f$ corresponds to an initial position $q_i(2)$ from which a fine motion plan will be generated to take the workpiece to a final position $q_g(2)$ which corresponds to an unloaded state (unloaded from the die space). Once the workpiece is unloaded, a plan which is generated by a gross motion planner will be utilized in the manner as shown in FIG. 6, e.g., to take workpiece 17 from a position $Q_f(2)$ at stage 1 to a position at stage 2.

Figure 9:
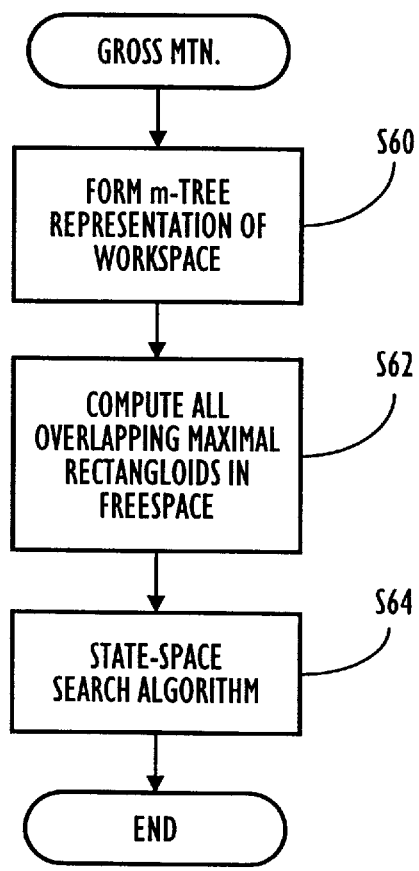
FIG. 9 is a flow chart indicating the general steps to be performed in order to generate a gross motion plan.

FIG. 9 is a flow chart which illustrates the general steps performed in the gross motion planning method illustrated. In a first step S60, a quadtree or octree representation is formed of a rectangloid (rectangle in 2D Euclidian space or parallelepiped in 3D Euclidian space) that surrounds the overall work space in which robot 16 (FIG. 3) will be moving. Thereafter, in step S62, all overlapping maximal rectangloids in free space are computed and called channels. In step S64, a state-space search algorithm is utilized in order to generate a sequence of movements to be made by robot 16 that will bring the robot safely through the channels from a starting position $Q_i$ to a goal position $Q_g$.

Figure 10:
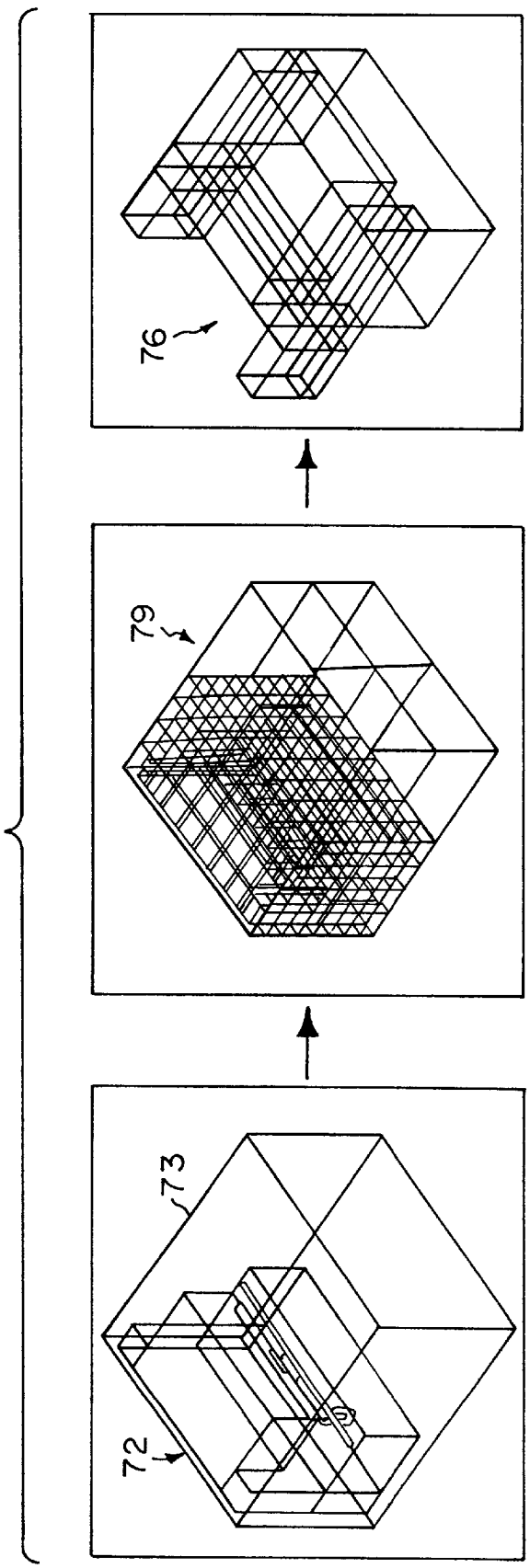
FIG. 10 includes graphic representations of various modeling steps performed in order to create a geometric model to be used for generating a gross motion plan.

Each of steps S60 and S62 of the general gross motion planning method illustrated in FIG. 9 may be performed as a preliminary step off-line (i.e., apart from the computer system used to run the bending planning/control system such as that shown in FIG. 4) to create a "channel file" that defines all of the computed overlapping maximal rectangloids, the channel file then being utilized by motion expert 44 of planning/control system 38. Such off-line calculations may include three main modeling steps as illustrated in FIG. 10. In a first step, a three-dimensional Euclidian model 72 of the bending press environment is prepared, where the model is bound by a parallelepiped 73 surrounding the bending press environment. Then, an octree representation 74 of three-dimensional Euclidian model 72 may be computed. Once octree representation 74 is computed, overlapping channels 76 are computed.

The bending press and its environments may be modeled utilizing an appropriate geometric modeler, such as, e.g., the NOODLES modeling system, developed at Carnegie Mellon University, Pittsburgh, Penn. Depending upon the geometric modeling system used, the bending press and its environment may be modeled by modeling the bending press and its hardware components as being solids, while modeling the surrounding free space as free space. However, for computational simplicity, it may be desirable to first model the machine, i.e., the bend press and its components, as a solid, and then to subtract that solid model of the bend press from a giant 3D solid block work space, which corresponds to parallelepiped 73 in FIG. 10 surrounding the bend press environment. The resulting solid then represents the free space surrounding the bend press. The octree representation 74 illustrated in FIG. 10 may then be formed from the resulting solid representation of the free space surrounding the bend press, and the maximal overlapping channels 76 may then be determined considering the solid cells in the octree representation. Each channel may be written out into a channel file and may be represented by a set of coordinates (e.g., world Cartesian coordinates) representing a pair of opposite corners of each channel. For example, both a lower left front corner and a top right back corner of each channel may be described in Cartesian coordinates in order to represent the bounds of each channel that was computed. The resulting "channel file" may then be read by motion expert 44 when it receives an initialization instruction from bend sequence planner 70.

Figure 11A:
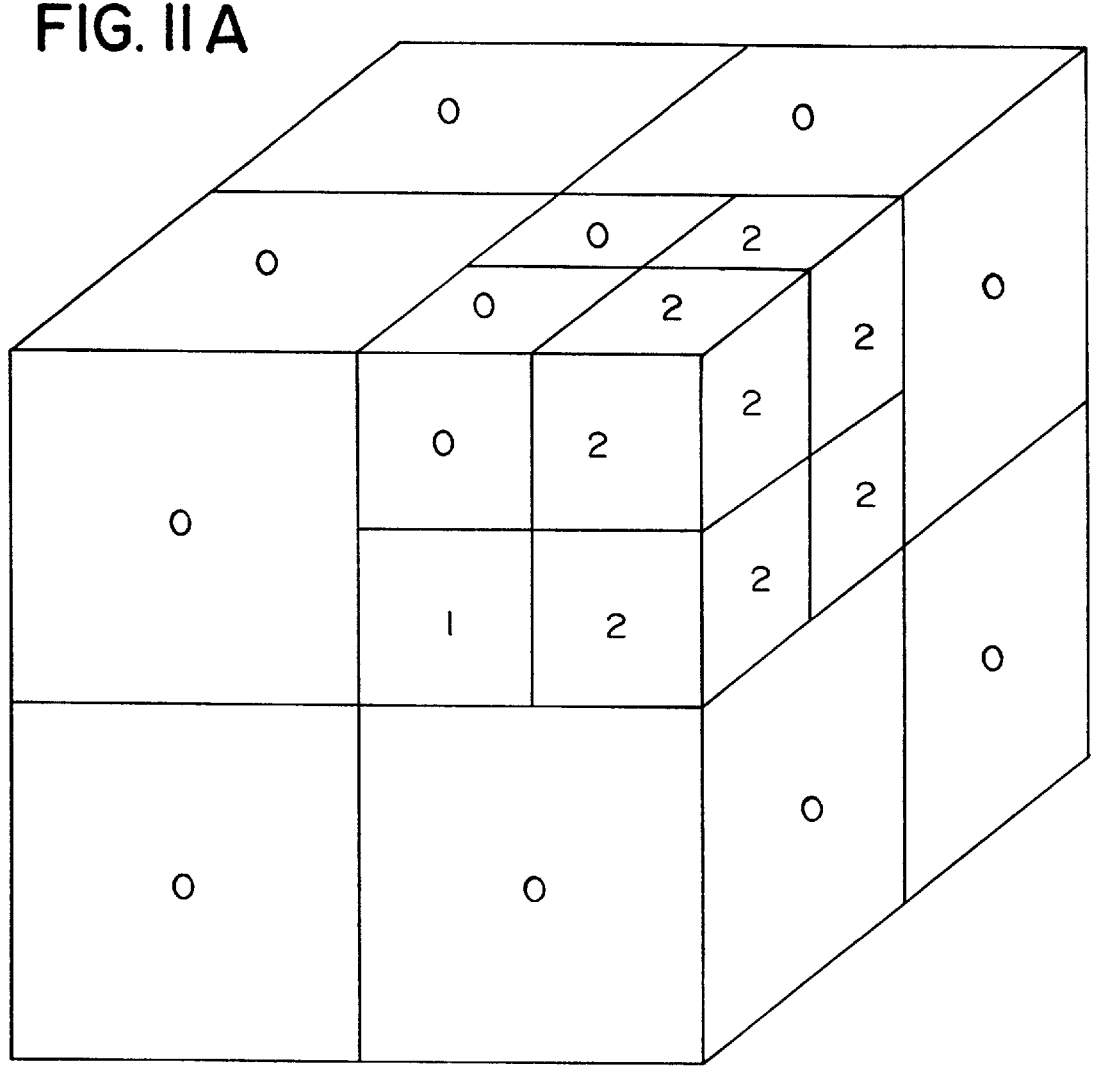
FIG. 11A comprises a graphic representation of a parallelepiped decomposition of an overall parallelepiped work space.
Figure 11B:
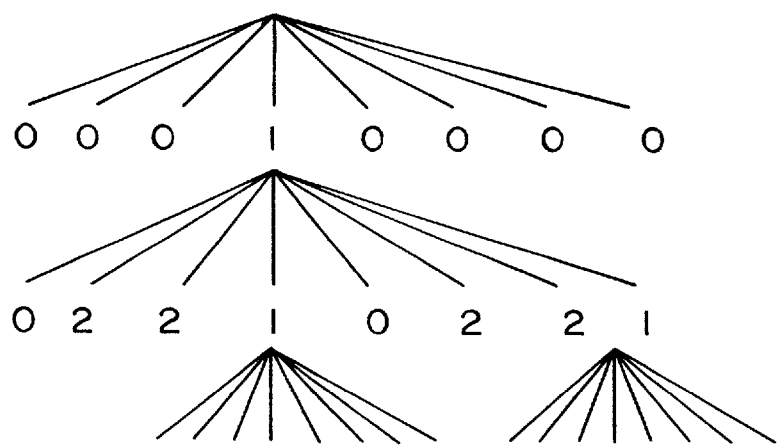
FIG. 11B illustrates an octree graph of the decomposition shown in FIG. 11A.

As shown in FIGS. 11A and 11B, octree representation 74 (FIG. 10) may comprise an octree binary refinement in three dimensional euclidian space of the space surrounding the bending press environment. Each parallelepiped volume element which is partially filled (i.e., mixed) is further broken down into eight elements and marked appropriately (i.e., as full, mixed, or empty) until a maximum resolution has been reached. As shown in the octree representation illustrated in FIGS. 11A and 11B, the volume elements may be marked with a binary representation of "0" for empty parallelepipeds, "1" for partially filled parallelepipeds, and "2" for completely filled parallelepipeds.

Figure 11C:
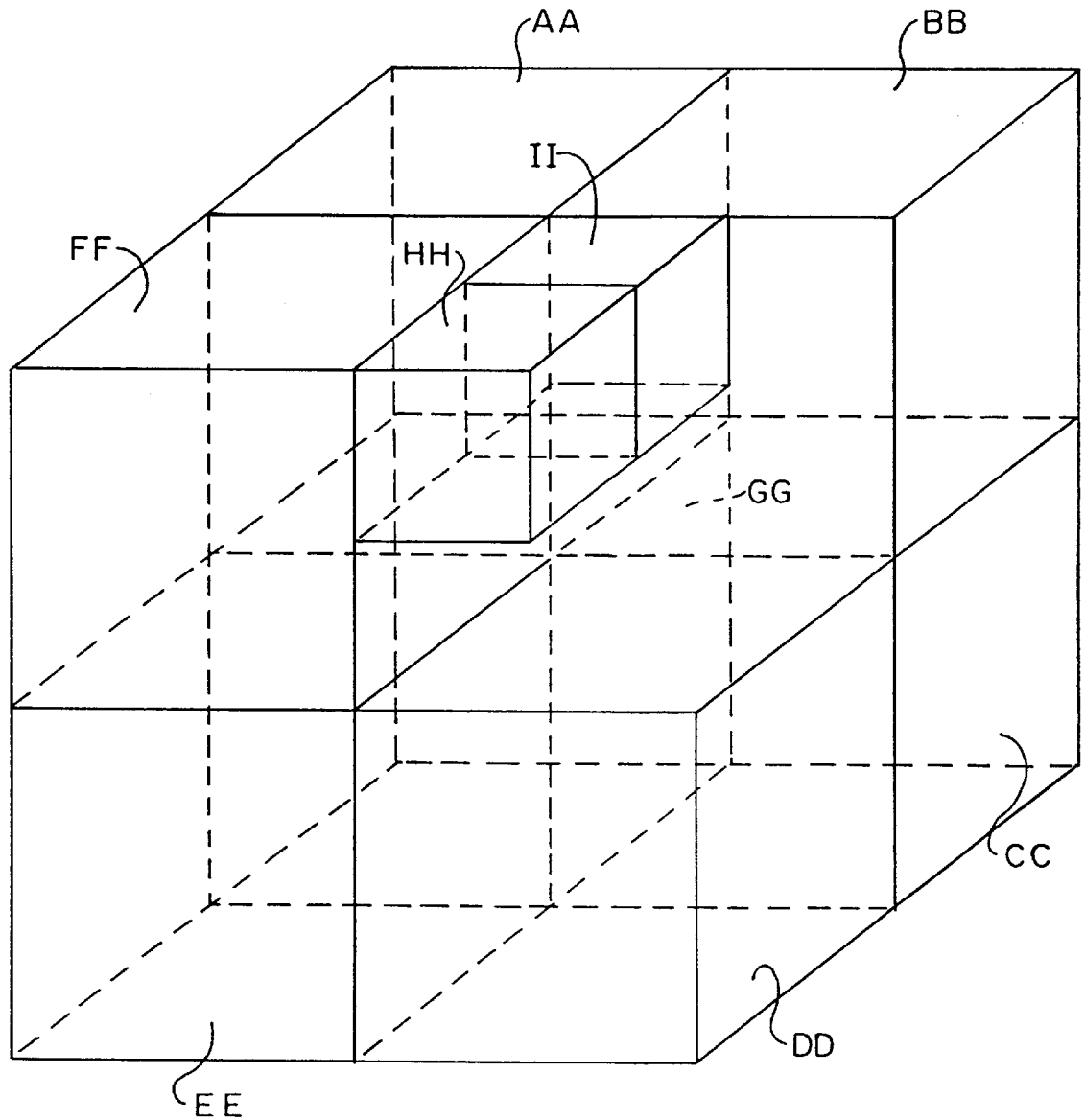
FIG. 11C comprises a graphic representation of resulting free space parallelepipeds that may be formed from the decomposition shown in FIG. 11A.
Figure 11D:
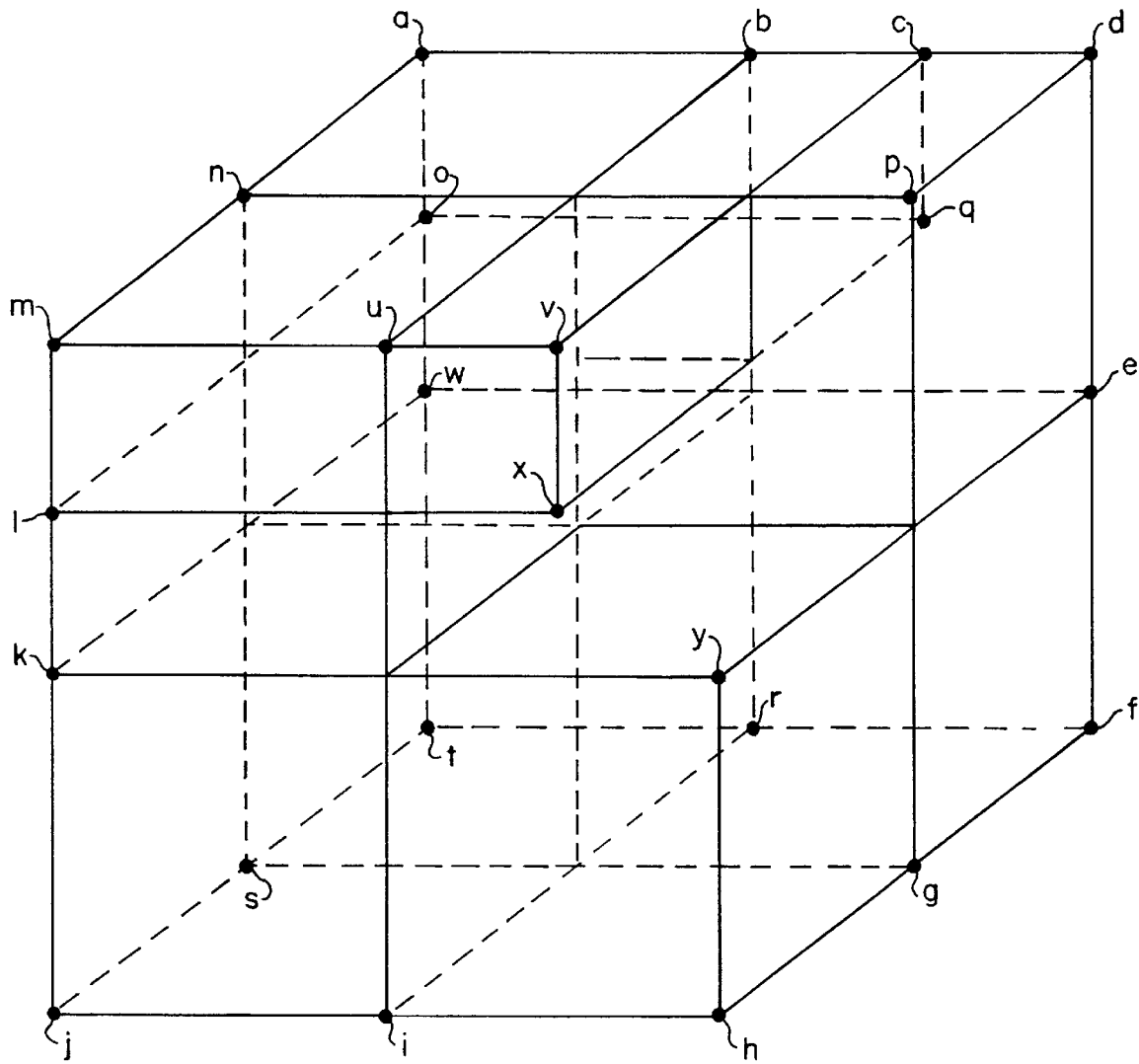
FIG. 11D comprises a graphic representation of the maximal overlapping parallelepipeds formed from the free space parallelepipeds illustrated in FIG. 11C.

FIGS. 11C and 11D are provided to illustrate the relationship between an octree decomposition and the maximal overlapping channels that correspond to the free space cells of the composition. FIG. 11C shows each of the free space cells of the octree representation shown in FIG. 11A. A total of 9 free space cells AA, BB, CC, . . . II are illustrated in the resulting representation in FIG. 11C. FIG. 11D is a graphic representation of the maximal overlapping parallelepipeds that correspond to the free space cells illustrated in FIG. 11C. A first maximal overlapping parallelepiped, represented by the eight vertices (a, d, f, t, n, p, g, s) is formed by the four free space cells (AA, BB, CC, and GG). A second maximal overlapping parallelepiped includes vertices (m, a, t, j, u, b, r, i), and is formed by free space cells FF, AA, GG, and EE. A third maximal overlapping parallelepiped is represented by vertices (j, t, f, h, k, w, e, y), and is formed by free space cells EE, GG, CC, and DD. A fourth maximal overlapping parallelepiped may be represented by vertices (l, o, q, x, m, a, c, v), and is formed by a portion of free space cells FF, AA, and BB, along with complete free space cells II and HH.

Each of the maximal overlapping parallelepipeds are deemed free space channels, and will be used to calculate a solution path through the channels from a start position $Q_{init}$ to a goal position $Q_{goal}$.

Figure 12A:
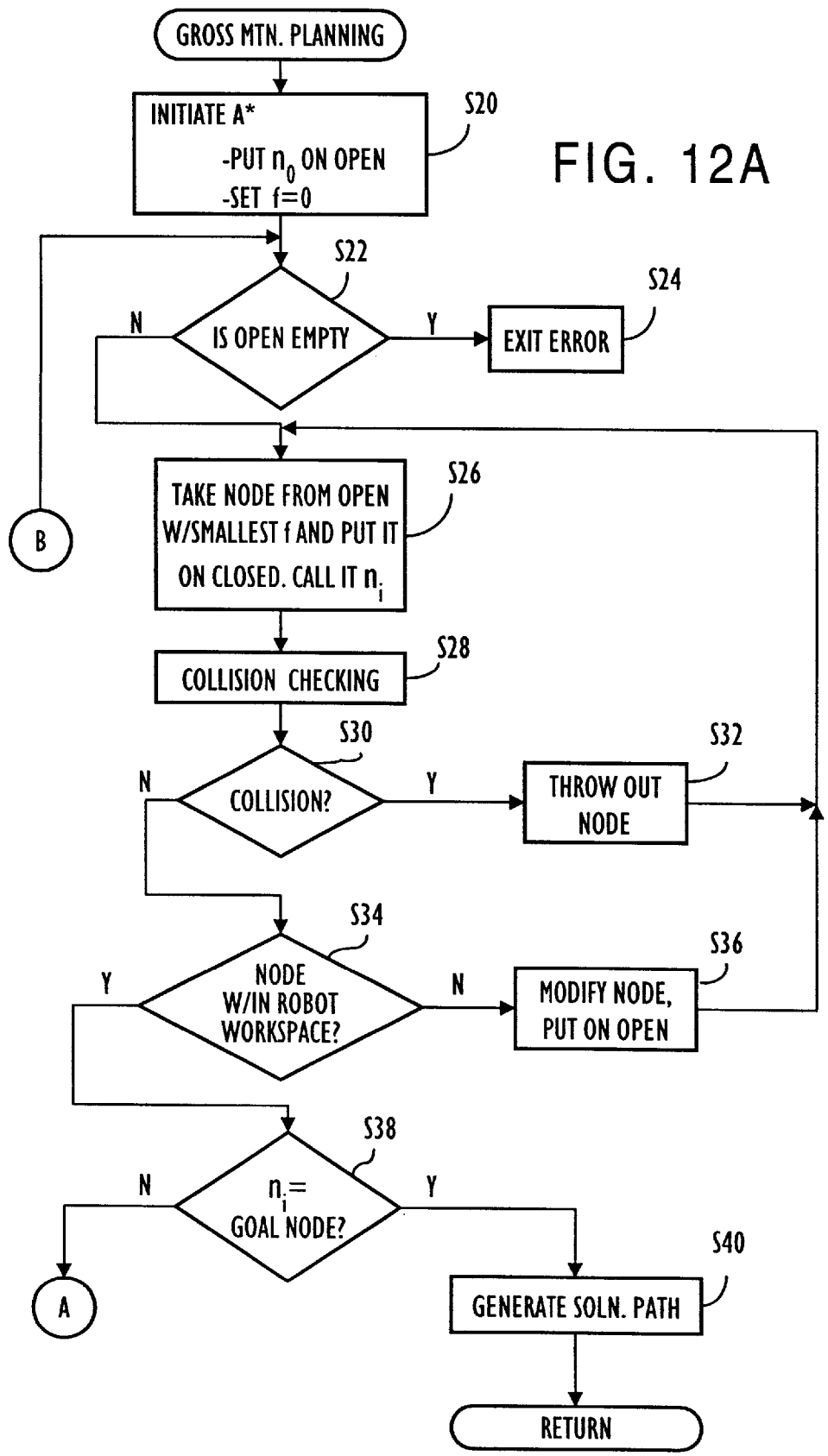
FIGS. 12A and 12B comprise a flow chart of a gross motion planning method.

FIG. 12A illustrates an example of a main algorithm which may be performed by gross motion planning module 44a which is provided in motion expert 44 of the planning/control system 38 illustrated in FIG. 11C. In a first step S20, the process initiates an A* algorithm, by placing a node $n_0$ on an OPEN list and setting an f value equal to 0. Then, in step S22, a determination is made as to whether or not the OPEN list is empty. If the OPEN list is empty, the process proceeds to step S24, at which the point the process exits with an error indication. If the OPEN list is not empty, the process proceeds to step S26. In step S26, the node with the smallest f value is taken from the OPEN list and placed on a CLOSED list, and that node is called $n_i$. Then, in step S28, collision checking is performed in order to determine if the movement corresponding to the node that was placed on the CLOSED list would result in a collision between the robot or workpiece and one or more components of the bending apparatus. Then in step S30, a determination is made as to whether the collision checking resulted in a collision. If so, the process proceeds to step S32, where the checked node is thrown out, i.e., eliminated from consideration by the search process, and the process then returns to step S26. If no collision was determined at step S30, the process proceeds to step S34, which determines whether or not the node results in a movement of the robot that is within the robot's work space limits. If the movement corresponding to the node is not within the robot's work space, the process proceeds to step S36, where the node is modified in order to change the movement of the robot to cause the same effective movement of the workpiece, while keeping the robot within its defined work space limits. The modified node is then placed upon the OPEN list. The process then returns to step S26. If the node is within the robot work space as determined at step S34, the process proceeds from step S34 directly to step S38, which checks if the node $n_i$ is the goal node. If the node $n_i$ is the goal node, the process proceeds to step S40, where a solution path is generated, and the process thereafter returns.

If the node $n_i$ is not the goal node, the process proceeds from step S38 to step S42, at which point the node $n_i$ is expanded in order to get its successors $n_j$. Then, for each expanded/successor node $n_j$, each of steps S44, S46 and S48 is performed. In step S44, an h cost is calculated to be the approximate time to travel over Euclidian distance from the node location to the goal. In step S46, the k cost is calculated to be the travel time from the previous node location to the present successor node location. Then, in step S48, the f value is calculated in accordance with the equation:

$f(n_j)=(k'+h)$, where k' is equal to the sum of k values for each of the nodes in the search tree from the initial node $n_0$ to the present successor node $n_j$.

After each of steps S44, S46 and S48 have been executed for each successor node $n_j$, the successors are placed upon the OPEN list in step S50, associated with their calculated f values and including pointers to their parent node.

In expanding a node $n_i$ to get its successors $n_j$, the successor nodes $n_j$ are defined to include respective movements within defined subsets of movements that can be made within each of the channels within which the robot and workpiece are located (at the position corresponding to the parent node $n_i$). For each channel which overlaps the present location of the robot and workpiece at node $n_j$, the subset of movements may include the following (in Cartesian world coordinates):

(a) move +/–90° in pitch and yaw;
(b) move +/–90° in pitch;
(c) move +/–90° in yaw;
(d) translate to one of eight corners of a current channel in which the robot is positioned;
(e) translate to the goal if the goal is within a current channel, and if only a translation (i.e., no rotation) is needed to move to the goal;
(f) move the X component to the goal;
(g) move the Y component to the goal; and
(h) move the Z component to the goal.

The above-described gross motion movements within a current channel, which may be utilized to form the successor nodes $n_j$, are each listed in FIG. 12C.

Figure 12B:
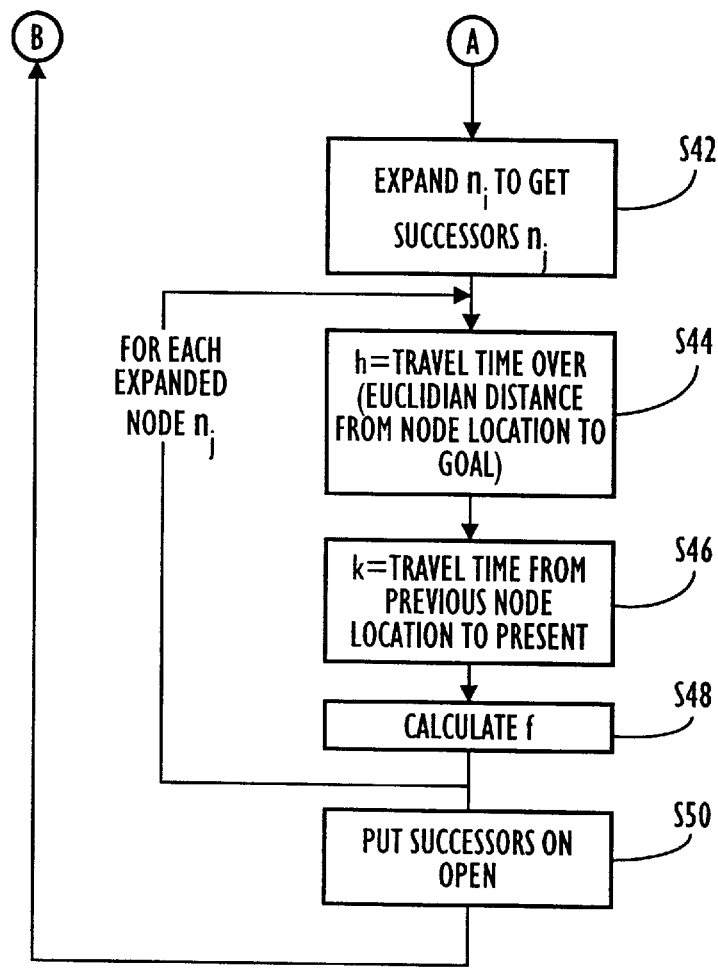

As noted above in the gross motion planning process of FIGS. 12A and 12B, each successor node which is deemed to have the smallest f value at a particular level of the search is tested in step S34 to determine if the robot will remain within its defined work space limits. If the robot is not within its defined work space limits, the process proceeds from step S34 to step S36, where the node is modified so that the workpiece can be manipulated in a similar manner, but with the robot remaining within its work space limits.

Figure 13:
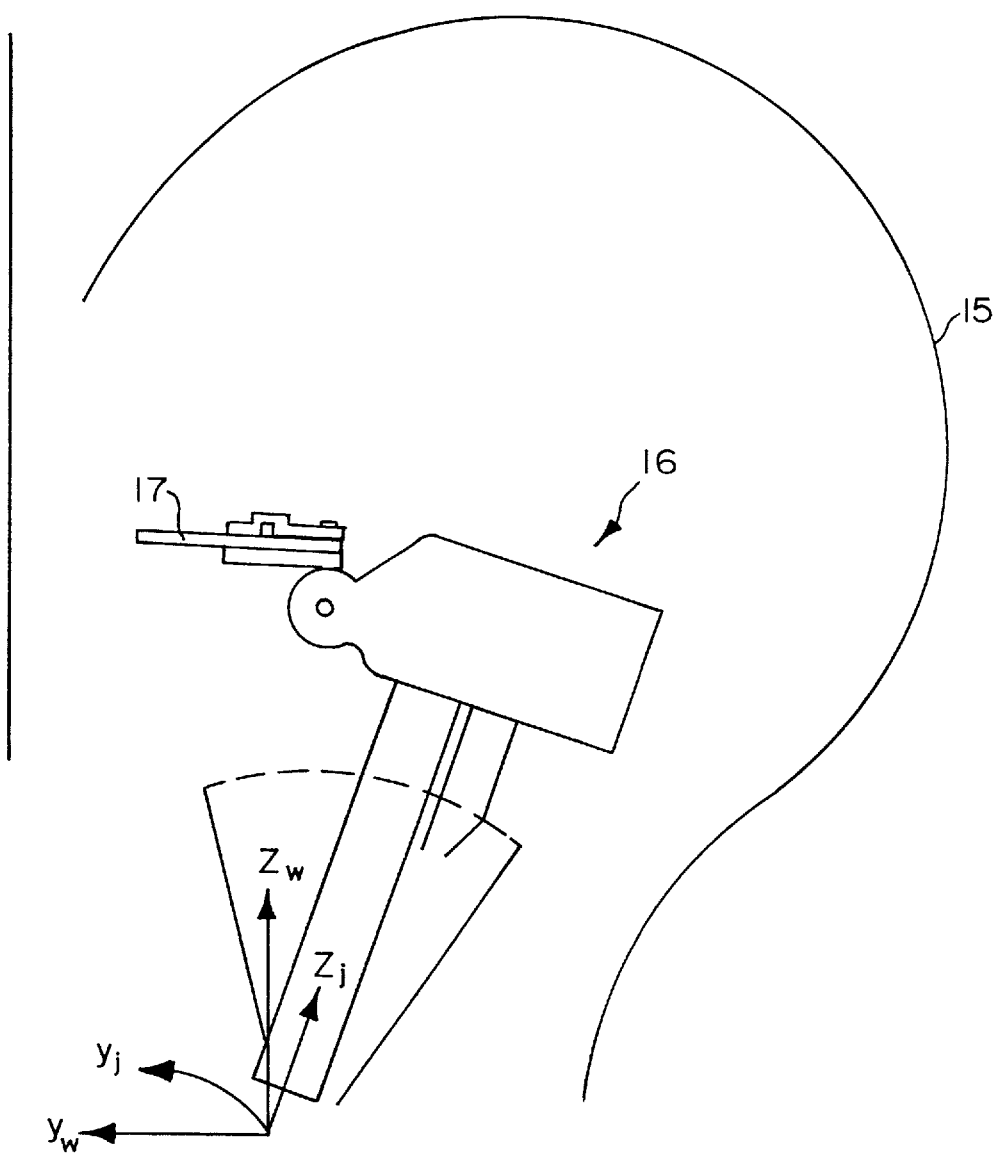
FIG. 13 illustrates a side view of a robot and a line that represents limits of the robot work space.

FIG. 13 illustrates a side view of a robot 16 holding a workpiece 17. Robot 16 has joint coordinates $Y_J$ and $Z_J$ and Cartesian world coordinates $Y_W$ and $Z_W$, which may be utilized to define movements of robot 16 with respect to a particular tool centerpoint (TCP) which relates to the position of the robot gripper. Among the several gross motion movements (listed in FIG. 12c) that may be specified as a successor node $n_j$ in step S42 of the gross motion planning process illustrated in FIGS. 12A–12B, some such movements may not be possible since they may bring robot 16 outside of its work space limits. FIG. 13 shows a line 15 which is indicative of the robot's work space limits. Such a line may be calculated using one or more appropriate equations (e.g., a line equation) based upon the dimensions and operational relationships of various movable components of robot 16; or line 15 may be determined empirically by bringing robot 16 to several of its maximum locations throughout its work space.

Among the gross motion movements which are limited by the work space line 15 are the amount of ΔZ in the negative $Z_W$ direction in which the robot may be moved from a certain location, and the amount of ΔY in the $-Y_W$ direction in which the robot may be moved. If a large ΔY in the $-Y_W$ direction is desired, an increased $Z_W$ coordinate (in the $+Z_W$ direction) may be needed in order for the robot to be maintained within its work space as defined by line 15. If a large ΔZ in the $-Z_W$ direction is desired, an increased YW coordinate (in the $+Y_W$ direction) may be needed in order to maintain the robot in its work space. Modifications of this type are performed in step S36 of the gross motion planning process illustrated in FIG. 12A, before placing a node having such modifications back on the OPEN list and returning to step S26. Similar modifications may be made to other gross motion movements which are to be considered as successor nodes $n_j$, such as the movements illustrated in FIG. 12C. For example, if a certain change in pitch and yaw will take the robot outside of its work space limits, a modification of one or more of other coordinates of the robot in connection with the change in pitch and yaw may bring the robot back within its work space limits.

Figure 14:
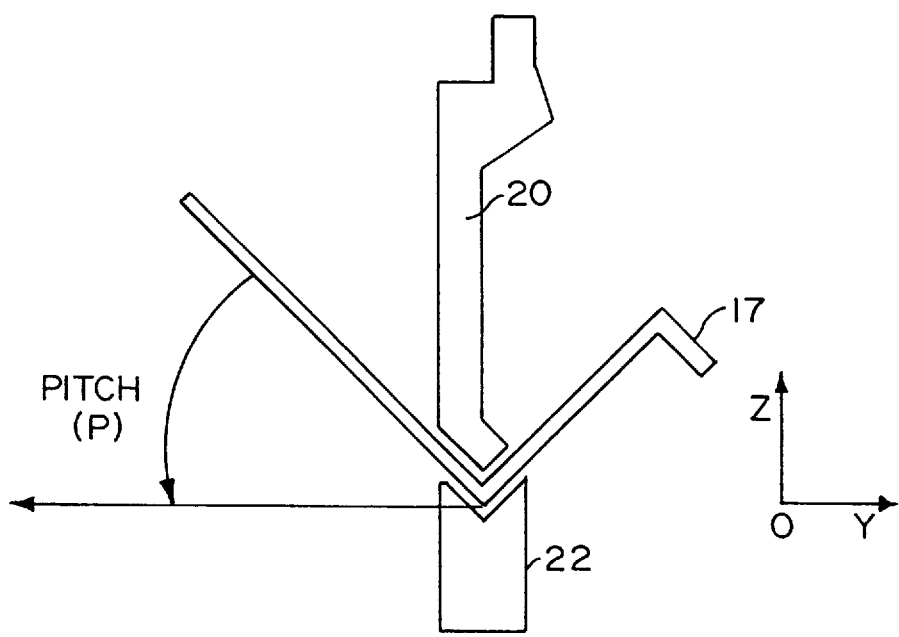
FIG. 14 is a side view of a workpiece, punch, and die.

FIG. 14 illustrates a workpiece 17 after completion of a 90 degree bend with bend-following, compressed between a tool punch 20 and a die 22. Workpiece 17 is now ready to be unloaded from the die space, by moving in a −Z direction, a −Y direction and in the +P direction (i.e., by increasing the pitch P to bring the workpiece down towards a horizontal position). The goal position of workpiece 17 is a position at which the workpiece is unloaded from the die space, in a substantially horizontal position, and away from the tool punch 20 and die 22. As noted above, tooling expert 43 (see FIG. 14) of planning/control system 38 may be provided with a fine motion planning module 43a which generates a motion plan that includes a list of sequential movements to be performed by a robot to perform either or both of (1) loading workpiece 17 into the die space, and (2) unloading workpiece 17 from the die space after a bend has just been completed. Each complete sequential list of movements is integrated with the gross motion plans produced by motion expert 44.

Figure 15:
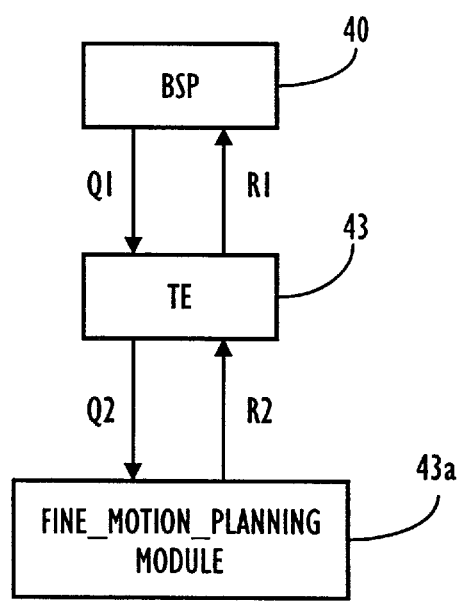
FIG. 15 is a block diagram representing the communication between a bend sequence planner, a tooling expert and a fine motion planner.

FIG. 15 provides an illustration of bend sequence planner 40, tooling expert 43, and fine motion planning module 43a, and the dialogue that is performed between those modules throughout the generation of a plan by the planning/control system 38 illustrated in FIG. 4. In a first query Q1, bend sequence planner 40 forwards a query to tooling expert 43, along with a flag called CALL_FINE_MOTION which is set to either TRUE or FALSE. If CALL_FINE_MOTION is set to TRUE, tooling expert 43 is instructed to compute a fine motion path/plan. If the flag is FALSE, a fine motion plan will not be computed, and other tooling expert operations are performed. The setting of the flag to FALSE may be useful, e.g., if bend sequence planner 40 already knows the fine motion plan since it was previously computed for an identical bend.

If CALL_FINE_MOTION flag is TRUE, tooling expert 43 then sends a query Q2 to fine motion planning module 43a, causing fine motion planning module 43a to be executed. Fine motion planning module 43a then returns, in response R2, a variable FINE_MOTION_COST to tooling expert 43. The variable is 0 if a fine motion plan could be generated, or infinity if a fine motion plan could not be generated. In addition, if a fine motion plan can be generated, fine motion planning modules 43a also returns, in response R2, a FINE_MOTION_PLAN data structure which includes a list of movements in sequence to be performed by the robot in order to bring the workpiece from an initial position $q_i$ to a goal position $q_g$. The FINE_MOTION_PLAN data structure may include, e.g., two lists, the first list representing the sequence of movements to be performed in order to load the workpiece into the die space, and the second list comprising a sequence of movements to be performed in order to unload the workpiece from the die space after the bend has been completed with bend-following.

The following is an example of data in FEL which may be generated by fine motion planning module 43a and forwarded to tooling expert 43 via response R2:

```
(FINE_MOTION_COST 0)
(FINE_MOTION_PLAN (([first list of sequential movements
  corresponding to loading workpiece into die space – now empty]
  )
  ((0.00 0.00 −30.00 ) (0.00 −50.00 0.00 ) (5.00 0.00 −5.00
  )
  (5.00 0.00 −5.00 ) (0.00 −5.00 0.00 ) (5.00 0.00 −5.00
  )
  (0.00 −15.00 0.00 ) (5.00 0.00 −5.00 ) (5.00 0.00 −5.00
  )
  (0.00 −5.00 0.00 ) (5.00 0.00 −5.00 ) (0.00 −45.00 0.00
  )
  (5.00 0.00 5.00 ) (5.00 0.00 5.00 ) (5.00 0.00 5.00
  )
  (0.00 0.00 5.00 )
  )
)
```

Each of the movements listed in the second (unload) list of movements provided in the example FINE_MOTION_PLAN data structure comprises a relative motion vector in C-space, and thus represents the movement of the combined robot and workpiece 16/17 as a point in C-space. Each relative motion vector is given in terms of P in degrees, Y in mm, Z in mm. Accordingly, the first movement in the unload list, which is (0.00 0.00 −30.00), indicates a downward movement of the workpiece by 30 mm (in the −Z direction) from its previous position. The next relative motion vector (0.00 −50.00 0.00) indicates a movement of the workpiece to take the workpiece out of the die space (toward the left in FIG. 14) by 50 mm. The third relative motion vector (5.00 0.00 −5.00) indicates that the workpiece is being moved in pitch down towards a horizontal position by 5° and simultaneously moved down in the z direction by 5 mm.

Once the FINE_MOTION_COST variable and the FINE_MOTION_PLAN data structures are returned to tooling expert 43 in response R2, tooling expert 43 then will return the FINE_MOTION_COST and FINE_MOTION_PLAN information to bend sequence planner 40 in response R1 along with other tooling-related information.

Figure 16:
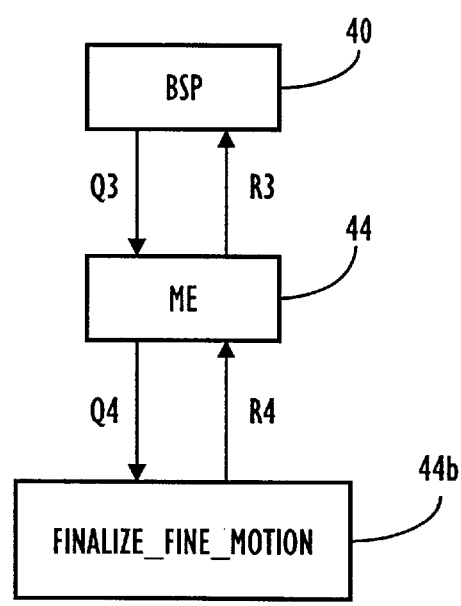
FIG. 16 is a block diagram illustrating the communication between a bend sequence planner, a motion expert, and a finalize fine motion, module.

FIG. 16 illustrates several modules related to the finalization of the fine motion plans, including the integration of the fine motion plans with the gross motion plans to form the overall sequence of movements to be performed. The figure shows a bend sequence planner 40, a motion expert 44 and a finalize fine motion module 44b. Bend sequence planner 40 puts all the fine motion plans together in a sequence, once all of the bends in a bend sequence have been generated and the search process performed by bend sequence planner 40 has been completed. The resulting fine motion plans are forwarded to motion expert 44, along with other motion-related information, in a query Q3. Motion expert 44 then forwards a data structure FINE_MOTION_SEQUENCE to finalize fine motion module 44b in query Q4. The finalize fine motion module 44b then converts the relative C-space motion vectors present in the FINE_MOTION_SEQUENCE data structure to relative motion vectors in TCP robot world coordinates. The finalize fine motion module 44b then forwards, in response R4, a FINE_MOTION_POSITION data structure, along with motion commands to moving expert 44. The data structure includes relative motion vectors in TCP robot world coordinates, such relative motion vectors indicating the fine motion position commands that will be sent to the lower level robot trajectory planner for execution of the fine motion plan. Motion expert 44 then takes the FINE_MOTION_POSITION data and integrates the same with the gross motion commands, to form a complete integrated gross and fine motion command structure, in TCP world coordinates, which can be forwarded to a lower level robot trajectory planner for execution of the movements.

Figure 17A:
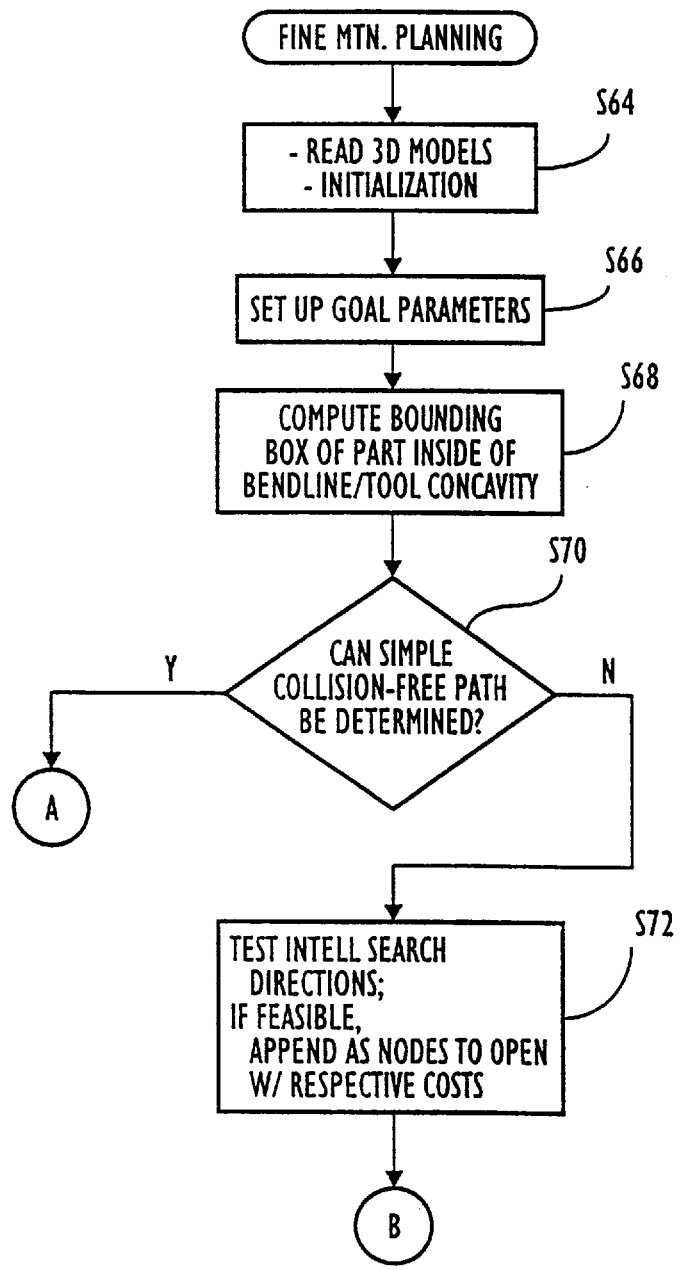
FIGS. 17A and 17B comprise a flow chart of the various steps performed during fine motion planning.
Figure 17B:
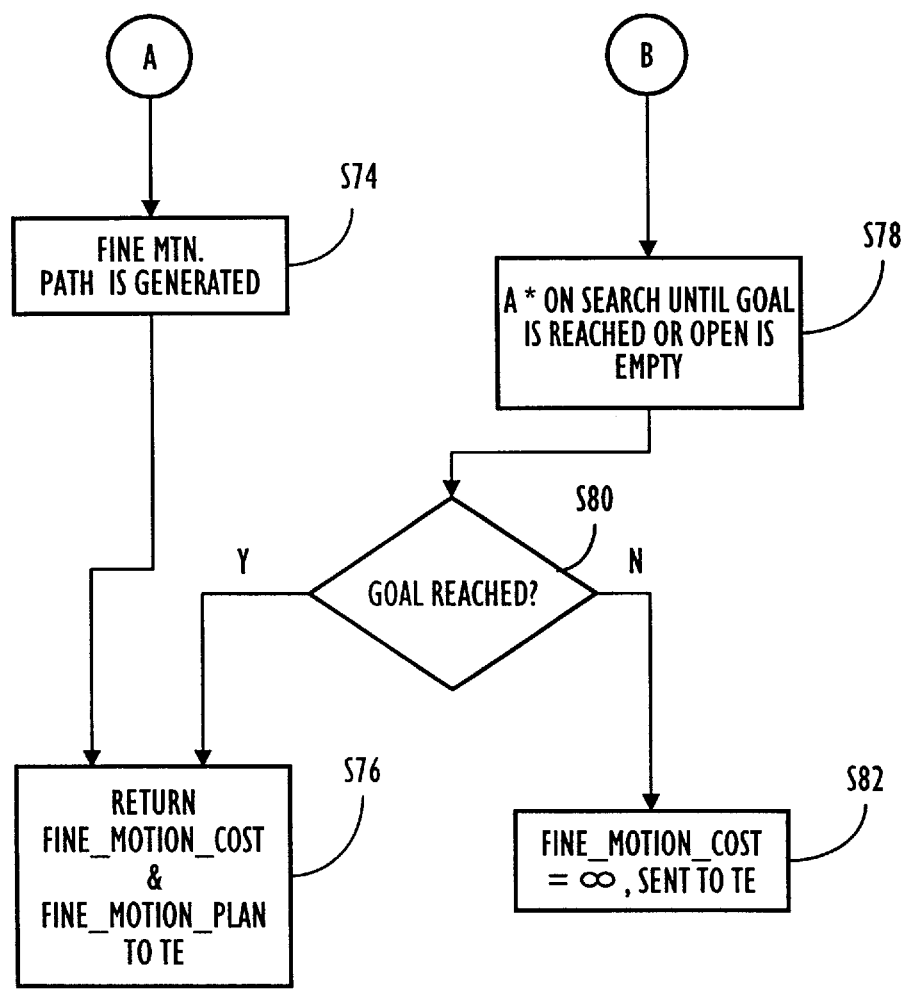

FIGS. 17A–17B comprise a flow chart of a fine motion planning process that may be performed by fine motion planning module 43a provided within tooling expert 43 of the planning/control system 38 illustrated in FIG. 4. In a first step S64 of the fine motion planning process, the 3D models of the punch tool and of the workpiece are read, and several initialization steps are performed. In step S66, the goal parameters are set up based upon the tool and part geometry and the desired clearance. The goal parameters are indicated in C-space, and indicate the goal position $q_g$, e.g., $q_g(2)$ as shown in FIG. 8.

It is noted that the fine motion planning algorithm depicted in FIGS. 17A–17B plans the unloading of a workpiece from a die space, and thus plans a path of movement from a position $q_i(2)$ to a goal position $q_g(2)$ as illustrated in FIG. 8.

In step S68, a bounding box is computed which surrounds the part inside of the bend line (i.e., in the tool concavity inside the bend line). The bounding box surrounds the workpiece in its present state bent at the present point in the bend sequence. The key geometric features, such as the height and width, of the bounding box (along the Z and Y dimensions, in world Cartesian coordinates), are then computed. Then, in step S70, a determination is made as to whether a simple collision-free path can be determined, by determining if the key features (the height and width of the bounding box) satisfy constraints imposed by the tool geometry and the die opening. For example, a determination may be made as to whether the height and width of the bounding box will fit through the die opening once the die is lowered to a certain point. If a simple collision-free path can be determined at step S70, the process proceeds (via connector A) to step S74 which is indicated at the top of FIG. 17B.

If a simple collision-free path cannot be determined, the process proceeds from step S70 to step S72, at which point the process will test several intelligent search directions to determine if such intelligent search directions are feasible. The feasible intelligent search directions are then appended as nodes to an OPEN list with respective costs corresponding to each appended node. Step S72 rapidly produces nodes which are close to the goal position. The intelligent search directions are indicated in terms of virtual configuration space (VC-space) relative vectors, and are tested to see if they are feasible by performing a negative intersection of the intermediate bent workpiece (at its present shape in the bend sequence) with the punch tool. If the negative intersection indicates that a collision would occur between the intermediate workpiece and the punch tool, then the node is not feasible. Otherwise, the node is feasible and is added to the OPEN list.

After step S72, the process proceeds to step S78, where an A* fine motion search is performed until the goal is reached or the OPEN list is empty. Then, in step S80, a determination is made as to whether the goal was reached. If the goal was reached, the process proceeds to step S76, where the fine motion planning module returns information including FINE_MOTION_COST and FINE_MOTION_PLAN to the tooling expert. If the goal was not reached as determined at step S80, the process proceeds to step S82, and a FINE_MOTION_COST of infinity is sent to the tooling expert.

In the modeling realm, i.e., in order to model the part as it is being moved to various positions indicated by relative virtual configuration space (VC-space) vectors, a model is maintained that represents the geometry and location of the part in relation to the tooling geometry, and the geometric modeler (e.g., NOODLES) moves the modeled part in Euclidian space (by an amount that corresponds to each relative VC-space vector) to form a differently positioned model of the part with respect to the tooling.

Figure 18:
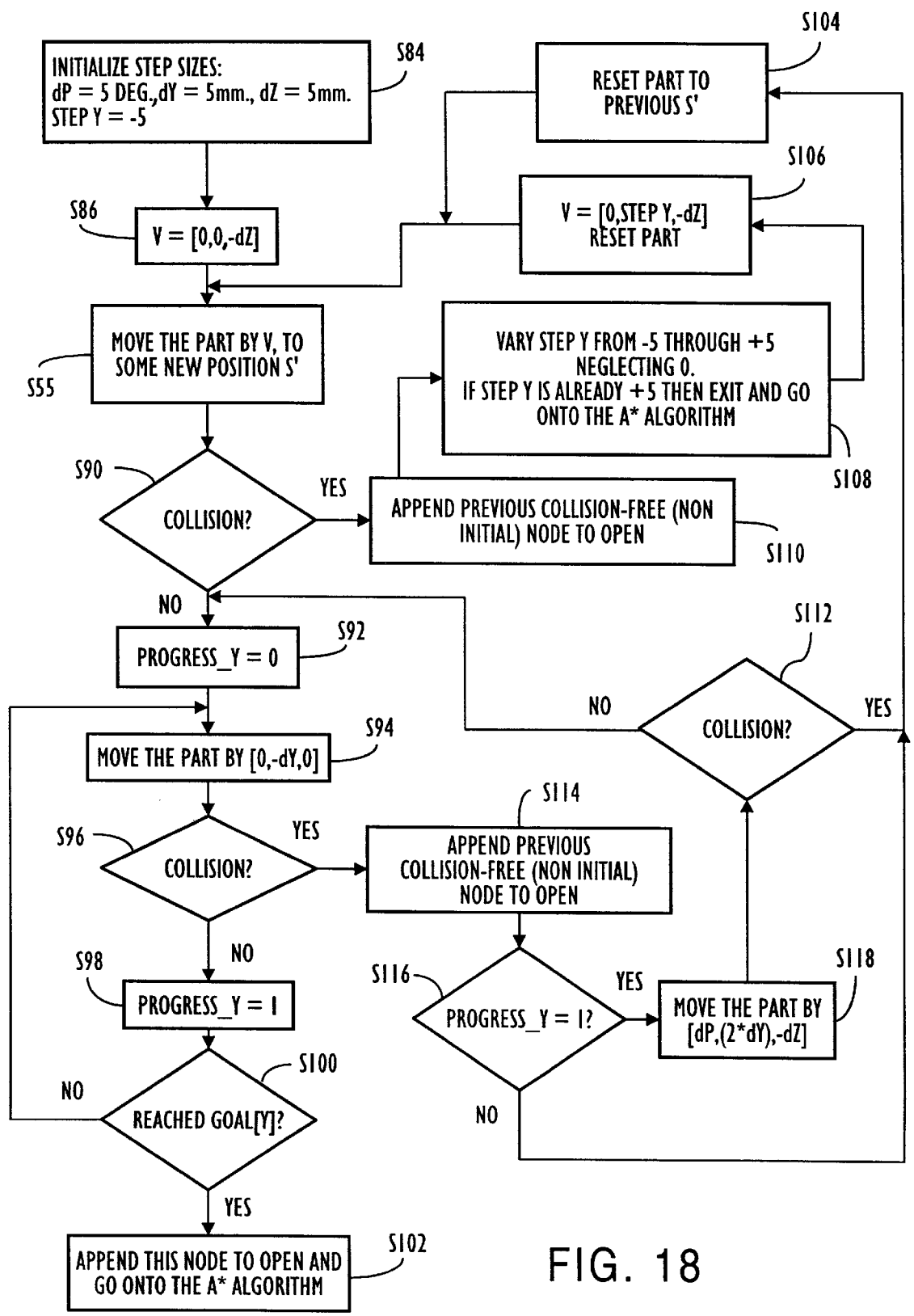
FIG. 18 comprises a flow chart of a process for determining intelligent search directions to be considered as successor nodes during the search performed by the illustrated fine motion planning method.

FIG. 18 is a flow chart illustrating the steps performed by the intelligent search algorithm which is indicated in step S72 of the fine motion planning process illustrated in FIGS. 17A–17B. In a first step S84 of the intelligent search algorithm, the process initializes several step sizes. In the particular embodiment illustrated, the step sizes are initialized as: dP (a change in pitch) =5°, dY (a change in Y direction) =5 mm, dZ (a change in Z direction) =5 mm, and stepY =–5. The relative motion vector V corresponding to a first proposed intelligent search direction is set to [0,0,–dZ] in step S86. Then, in step S88, the part is moved in the modeling realm by V to some new position S'. In step S90, a collision test is performed, i.e., a negative intersection is performed between the part and the tool, to determine if a collision would occur by moving the part to the new position S'. If a collision would occur by making such a movement, in step S110, the previous collision-free (non-initial) node (if any exists at the present point in the process) is appended to the OPEN list. Then, in step S108, the value stepY is incremented by a certain amount (skipping 0). If stepY is already +5 at this point in the process, then the process will exit and return to the fine motion planning process. After performance of step S108, in step S106, the part is reset by defining the vector as V=[0,stepY,–dZ], and the process returns to step S88, where the part is moved to some new position S' as a result of the vector V indicated in step S106.

If it was determined in step S90 that no collision would occur by moving the part to the new position S', the process proceeds to step S92, at which point a flag Progress_Y is reset. The process then proceeds to step S94, where the part is moved (in the modeling domain) by [0,–dY,0]. A determination is made in step S96 as to whether a collision would occur by moving the part in the manner indicated in step S94. If a collision would occur, the process proceeds to step S114. If a collision would not occur, the process proceeds to step S98, where the flag Progress_Y is set. After step S98, in step S100 a determination is made as to whether the position of the part, in the modeling realm, has reached a goal position in the Y direction. If the part has not reached its goal position in the Y direction, the process returns to step S94, at which point the part will be moved by an additional amount [0,–dY,0].

If a collision was detected as indicated by the determination step S96, the process proceeds to step S114 at which point the previous collision-free (non-initial) node will be appended to the OPEN list. Then, at step S116, a determination is made as to whether the Progress_Y flag is presently set to 1. If the Progress_Y flag is set to 1, the process proceeds to step S118, where the part is moved by [dP, (2*dY),–dZ]. The process then proceeds to step S112 to test if a collision would likely occur as a result of the movement indicated in step S118. If a collision would not occur, then the process proceeds from step S112 to step S92. If a collision would occur as determined in step S112, the process proceeds to step S104, where the part is reset to the previous S' position. The process then proceeds directly to step S88 where the part will be moved by the vector V, to a new position S'.

If a determination is made at step S100 that the goal position along the Y direction has been reached, then the process proceeds to step S102 where the present node, indicative of the last set of movements for which a collision was not detected, is appended to OPEN list. The process then returns to the fine motion planning process illustrated in FIGS. 17A–17B, and thus is ready for the A* motion search performed in step S78.

Figure 19:
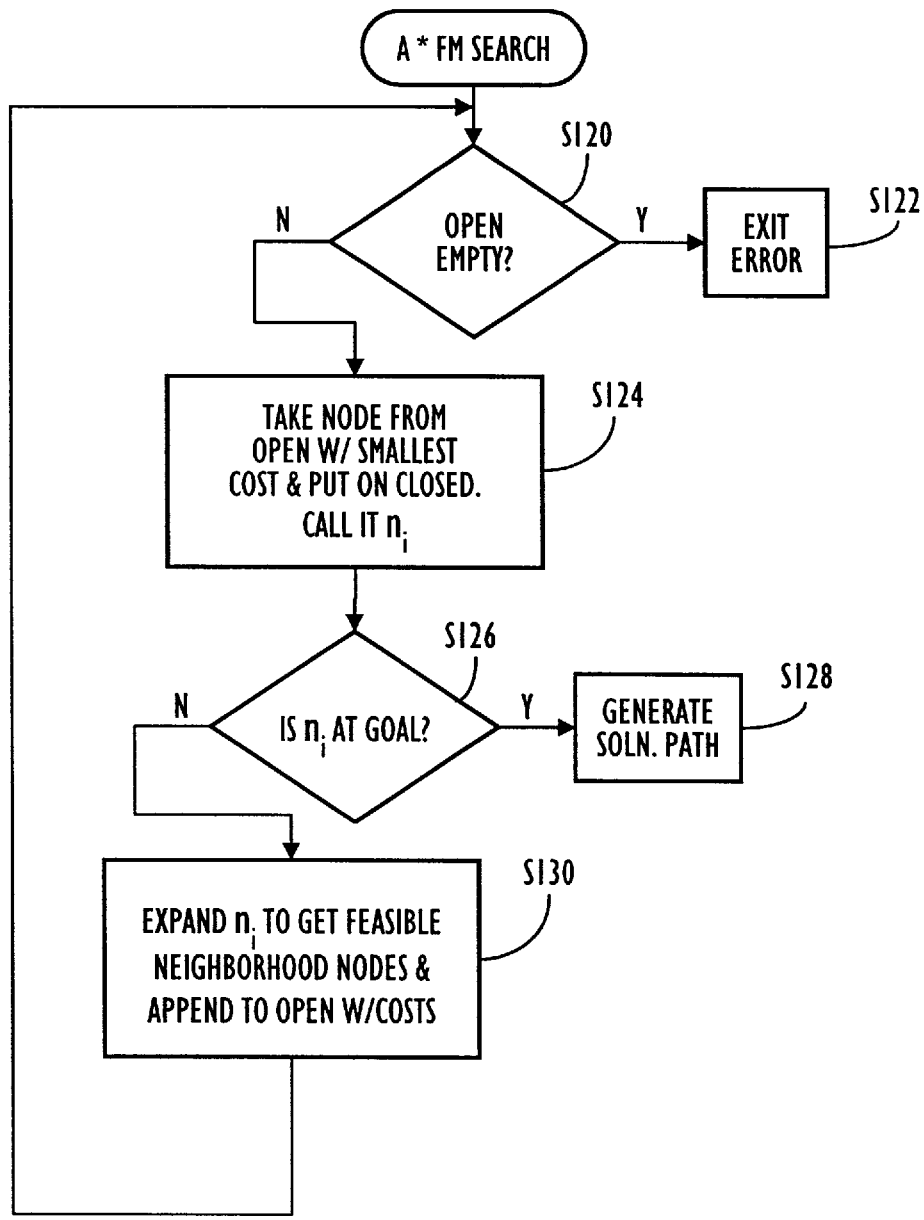
FIG. 19 is a flow chart of a state-space search algorithm performed in connection with the illustrated fine motion planning method.

FIG. 19 illustrates the A* fine motion algorithm which is indicated in step S78 of the fine motion planning process illustrated in FIG. 17A–17B. In a first step S120, a determination is made as to whether the OPEN list empty. If the OPEN list is empty, the process proceeds to step S122, where the search will exit with an error indication. If the OPEN list is not empty, the process proceeds from step S120 to step S124, at which point the node having the smallest cost is taken from the OPEN list and put on a CLOSED list. This node is called $n_i$. A determination is made in step S126 as to whether the node and $n_i$ is at the goal. If the node $n_i$ is at the goal, the process proceeds directly to step S128, where the solution path is generated. If the node $n_i$ is not at the goal, the process proceeds from step S126 to step S130, where the node $n_i$ is expanded to obtain feasible neighborhood nodes which form the successor nodes $n_j$ of the parent node $n_i$. The successor nodes $n_j$ are appended to the OPEN list with their respective costs. The neighborhood nodes may comprise a plurality of (i.e., 26) neighborhood positions surrounding in three dimensions the position of the workpiece at the parent node $n_i$. In order to determine if each neighborhood node is feasible, and whether each node should be added to the OPEN list, collision checking is performed. If a geometric intersection test is returned positive (indicating that no collision would occur), the neighborhood node is appended to the OPEN list along with its costs. The algorithm uses the euclidian distance from the particular neighborhood node to the goal node as a measure of cost, such cost being an h cost. It is noted that a value indicative of a k cost could be also determined and associated with each successor node. However, in the illustrated embodiment, no k cost is utilized, so that the computation time associated with the A* search may be minimized.

The A* algorithm for the fine motion search in FIG. 9 will continue until either the goal is reached or until the OPEN list becomes empty, whichever occurs first.

Figure 20:
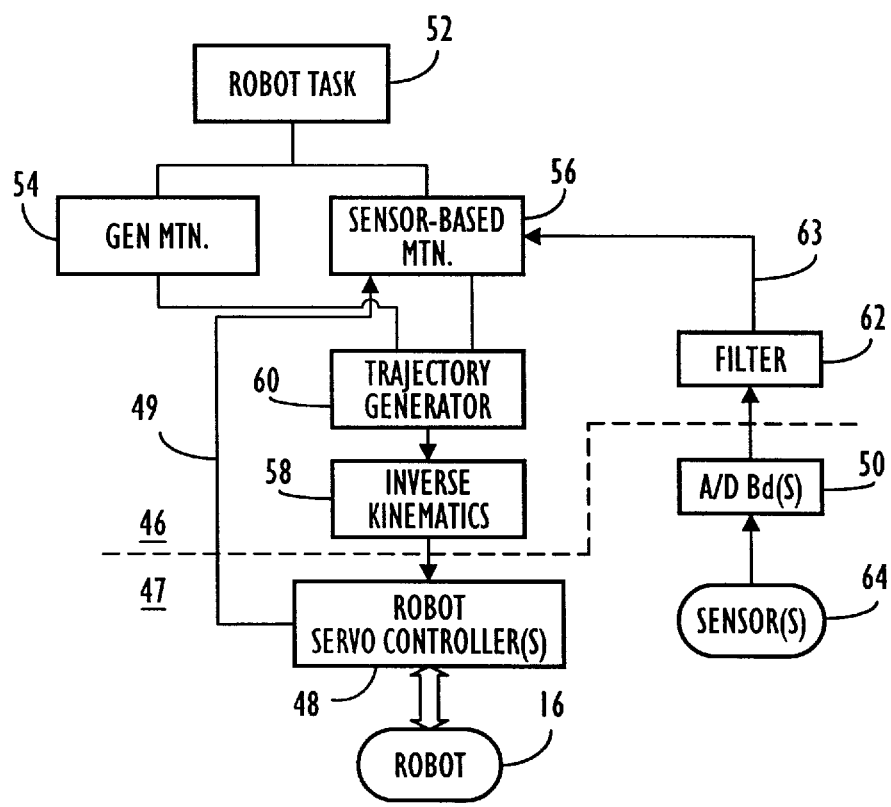
FIG. 20 is a block diagram of the robot control software, hardware and sensors which may be provided to execute the resulting plans produced by the gross motion planner and by the fine motion planner.

FIG. 20 illustrates the relevant portions of sequencer/controller 46 which are utilized to control the movements of the robot, and the various hardware and sensors 47 corresponding thereto. Sequencer/controller 46 includes, among other components, a robot task 52 which is coupled to a general motion module 54 and a sensor-based motion module 56. The general motion module may include a general motion library of functions, and the sensor-based motion module may comprise a sensor-based motion library of functions. Each of the general motion and sensor-based motion modules is connected to a trajectory generator 60, which is in turn connected to an inverse kinematics module 58. A filter 62, which may comprise a digital low pass filter implemented with software code, has an output which is connected to an input of sensor-based motion module 56. Each of the components of the sequencer/controller 46, including inverse kinematics module 58 and filter 62, is connected to hardware/sensors 47 via appropriate device drivers and hardware interfaces which may be implemented in accordance with the related application, U.S. application Ser. No. 08/338,113, entitled "Intelligent System for Generating and Executing a Sheet Metal Bending Plan" by David Alan Bourne et al., and further as disclosed in the program documentation for the CHIMERA II Real-Time Programming Environment, Version 1.02 (Oct. 24, 1990) by David B. Stewart et al., issued by the Carnegie Mellon University, Pittsburgh, Penn.

Inverse Kinematics module 58 is connected, via an appropriate device driver mechanism, to one or more to robot servo controllers 48, each of which is in turn connected to robot 16. Filter 62 is connected to one or more A/D boards 50, each of which is connected to one or more sensors 64. Each robot servo controller 48 is connected directly to sensor-based motion module 56 via a line 49, which is utilized to carry readings from a robot servo controller 48 regarding the five axis positions of robot 16, so that sensor-based motion control module 56 may make any necessary modifications to the position information to accommodate any inherent limitations of the robot, or so that robot sensor-based control module 56 will know whether the robot is actually moving in accordance with the control commands being given. Each of general motion control module 54 and sensor-based motion control module 56 is controlled by robot task 52 of sequencer/controller 46, and each direct movement of robot 16 from various initial positions to goal positions.

Each of the motion control modules 54, 56, during their respective times of operation, direct movement of the robot by outputting a list of knot points, in Cartesian space, through which robot 16 should be moved in order to go from an initial start position $Q_i$ to a goal position $Q_g$. The list of knot points, each point corresponding to a consecutive position along a free path from $Q_i$ to $Q_g$, is then input to a trajectory generator 60 which calculates a spline function for each coordinate of the robot 16. Each spline function extends between a pair of adjacent knot points. The resulting spline functions are then input to inverse kinematics module 58 in order to convert the appropriate information to joint space representations for controlling movement of the robot in joint coordinates. The one or more robot servo controllers 48 perform trajectory tracking of the respective axes of the robot in conformance with the spline functions input thereto.

Sensor-based motion control module 56 is provided for controlling motion of the robot in situations where sensing is needed, such as in performing a bend-following operation which corresponds to step S92 of the flow chart shown in FIG. 7 and step S8 of the overall bending process illustrated in FIG. 5. A sensing feedback mechanism is illustrated in FIG. 20, so that sensor-based motion plans may be executed. The sensing feedback mechanism comprises one or more sensors 64, one or more A/D boards 50, and a filter 62, connected in cascade, to sensor-based motion control module 56 via a sensing feedback line 63. Each of the one or more sensors 64 has its output connected to one or more A/D boards for converting the analog signals produced by the sensors to digital signals that can be manipulated in digital form by sequencer/controller 46. Filter 62 is placed between the output A/D boards 50 and an input of sensor-based motion control module 56, for the purpose of filtering out any unwanted (e.g., high frequency) noise which may be present within the signals produced by the sensors.

It is noted that each of robot servo controllers 48 may comprise a Creonics motion controller Model: MCCII S/W/ROM#255991.0 which is available from Allen Bradley. In accordance with the embodiment shown in FIG. 20, each robot servo controller 48 is capable of calculating robot actuator coordinates, i.e, the actual positioning of the robot actuators, and, accordingly, outputs appropriate signals to the micro switches and stepping motors of robot 16 to control movement thereof.

Figure 22B:
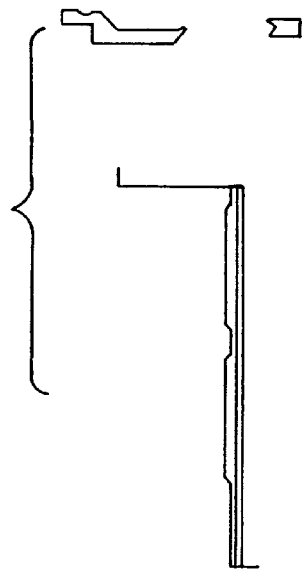
Figure 22D:
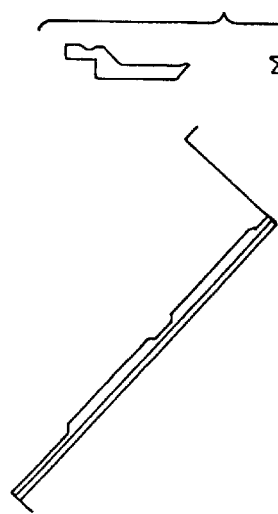
Figure 22A:
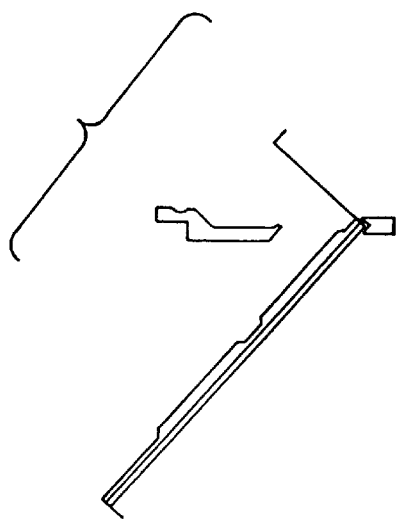
Figure 22C:
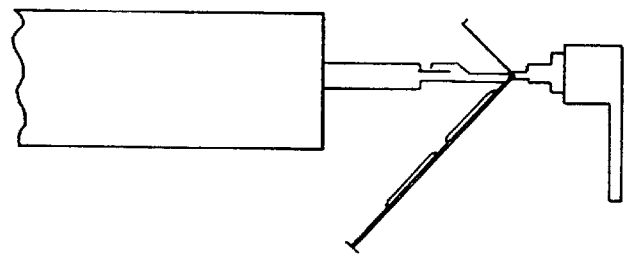

FIGS. 22(a)–(d), 23(a)–(f), 24(a)–(d), 25(a)–(d), 26(a)–(d), and 27(a)–(f) illustrate snapshots of a modelled workpiece as the workpiece relates to the punch tool and die when unloading the workpiece after a bend with bend-following has been executed. The examples illustrate the general motions that will be made during disengagement of the bend press and unloading of the workpiece from the die space. In FIG. 22(b), the die is lowered, disengaging the die from the tool punch, and the workpiece is simultaneously lowered in the Y direction. Then, the workpiece is pulled back in the Y direction, and the pitch of the workpiece is increased bringing the workpiece toward a horizontal position. The workpiece ends up in the goal position as indicated in FIG. 22(d).

In FIG. 23(a), the workpiece begins in its loaded bent state, and then proceeds to the state illustrated in FIG. 23(b), by simultaneously lowering the workpiece in the Z direction and disengaging the die from the punch tool. Then, the workpiece is moved as indicated in FIG. 23(c) in the −Y direction until it contacts the punch tool. The workpiece is simultaneously moved in the −Y and −Z directions until it clears the punch tool as indicated in FIG. 23(d). Then, the workpiece is moved in the −Y direction until it reaches the position as indicated in the FIG. 23(e). Then, the pitch of the workpiece is increased bringing the workpiece toward a horizontal position as indicated in FIG. 23(f).

Figure 24B:
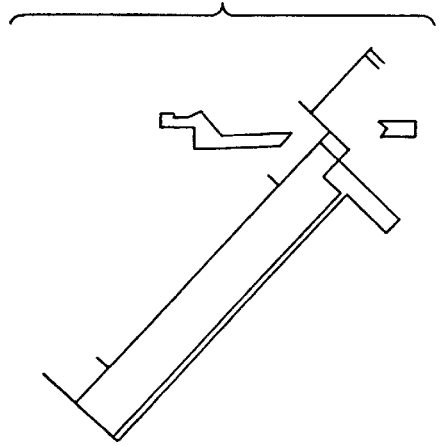
Figure 24D:
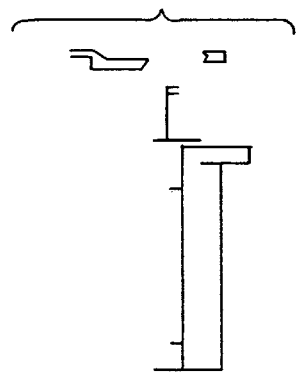
Figure 24A:
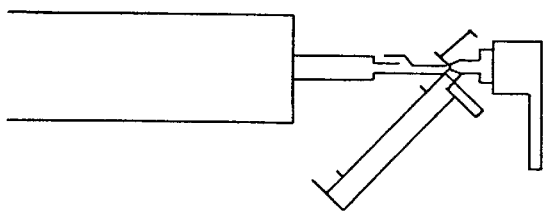
Figure 24C:
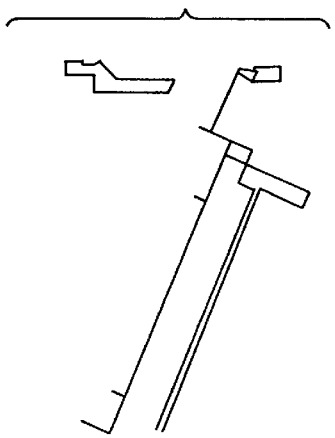

FIG. 24(a) illustrates a workpiece starting in its engaged bent state. The die is lowered and the workpiece is lowered slightly in the −Z direction as indicated in FIG. 24(b). When the die is lowered, the workpiece is simultaneously lifted upward in the +Z direction because of the presence of a down flange located at the bottom right corner portion of the workpiece. The workpiece is then moved in the −Y direction until it contacts the die as indicated in FIG. 24(c). The pitch of the workpiece is then simultaneously moved in the positive direction while the workpiece is moved in the −Y direction, resulting in the workpiece having a position as indicated in FIG. 24(d).

Figure 25A:
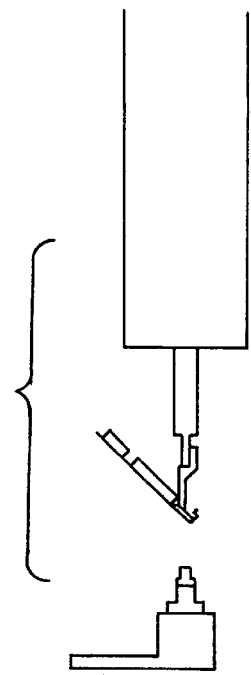
Figure 25B:
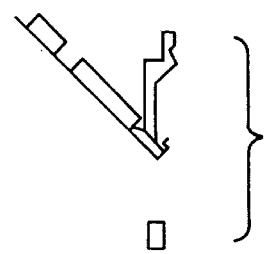
Figure 25C:
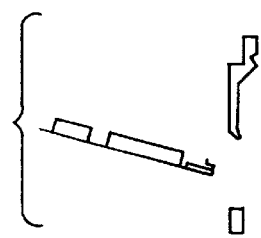
Figure 25D:
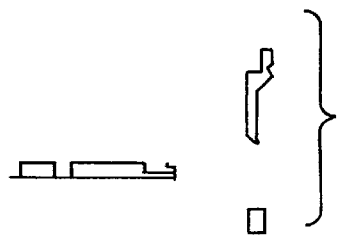
Figure 26A:
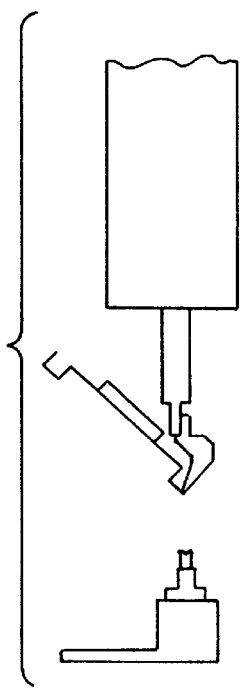
Figure 26B:
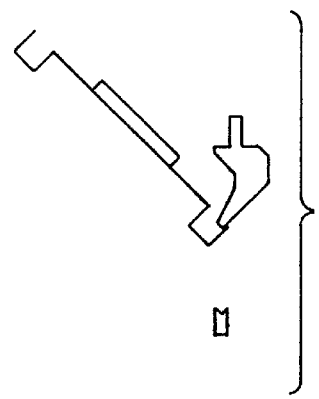
Figure 26C:
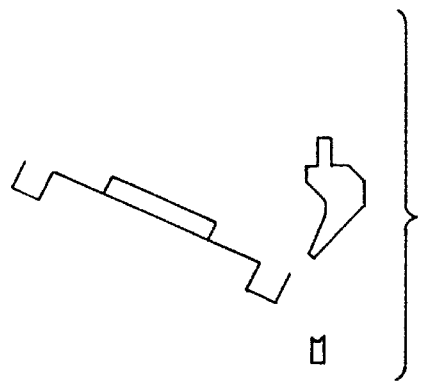
Figure 26D:
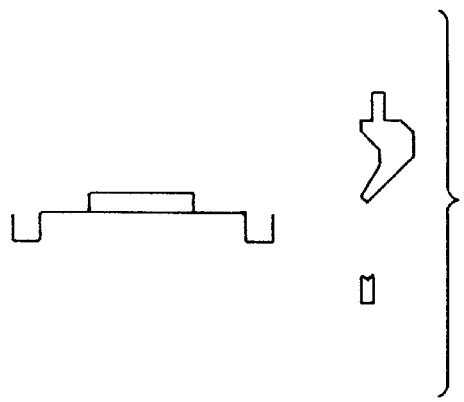

FIG. 25(a) illustrates a workpiece starting at a position at which the die has already been disengaged. As indicated in FIG. 25(b), the die is lowered, and in FIG. 25(c), the workpiece is moved in the positive pitch direction while backing the workpiece out of the die space in the −Y direction, until it reaches the goal position as indicated in FIG. 25(d). The workpiece shown in FIGS. 26(a)–(d) has a channel bend that was just formed by a goose neck punch. When there is a channel bend, or a bend similar to a channel bend, it is important to synchronously counteract the down action of the die with an upward action of the workpiece. Thus, when the die is lowered in FIG. 26(a) the workpiece should be raised in an upward direction. This prevents a collision between the workpiece and the outward side of the goose neck punch, which would occur if the workpiece was lowered in the −Z direction during lowering of the die. Then, as indicated in FIG. 26(b), workpiece is slid at an angle down the goose neck punch, by simultaneously moving the workpiece in the −Z and −Y directions. The sequencer/controller may be designed to perform active compliance in order perform this step, which includes intentionally keeping the workpiece in contact with the goose neck punch as it is slid along the surface of the goose neck punch until the workpiece clears the bottom tip surface of the goose neck punch. Once the workpiece clears the bottom tip surface of the punch, the workpiece may be moved in the −Y direction while moving the workpiece in the positive pitch direction until the workpiece reaches its goal position as indicated in FIGS. 26(c) and (d).

Figure 27C:
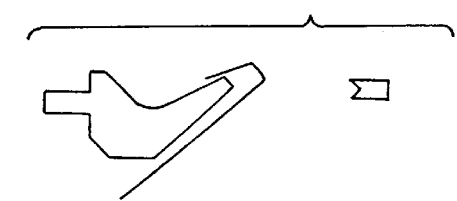
Figure 27F:
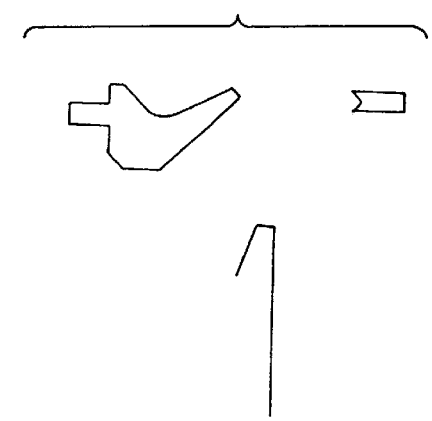
Figure 27B:
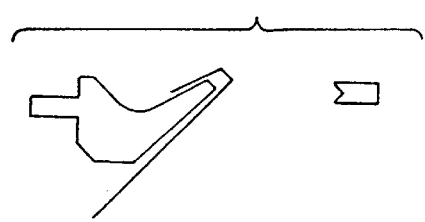
Figure 27E:
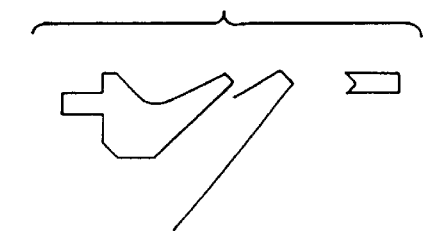
Figure 27A:
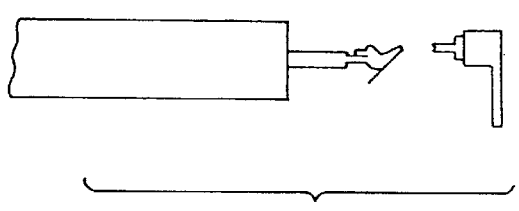
Figure 27D:
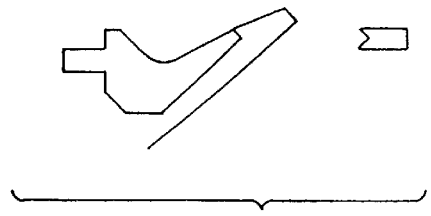

FIGS. 27(a)–(d) illustrate a workpiece which must be simultaneously moved in the upward (+Z) direction during disengagement of the die in FIG. 27(a), and which must be slid down in the −Z, +Y directions (optionally using active compliance), as indicated in each of FIGS. 27(b), (c) and (d). Once the workpiece has passed the bottom point of the goose neck punch as indicated in FIG. 27(e), the workpiece may be moved in the −Y direction and in the + pitch direction until it reaches its goal position as shown in FIG. 27(f).

FORWARD AND REVERSE KINEMATICS

Figure 21:
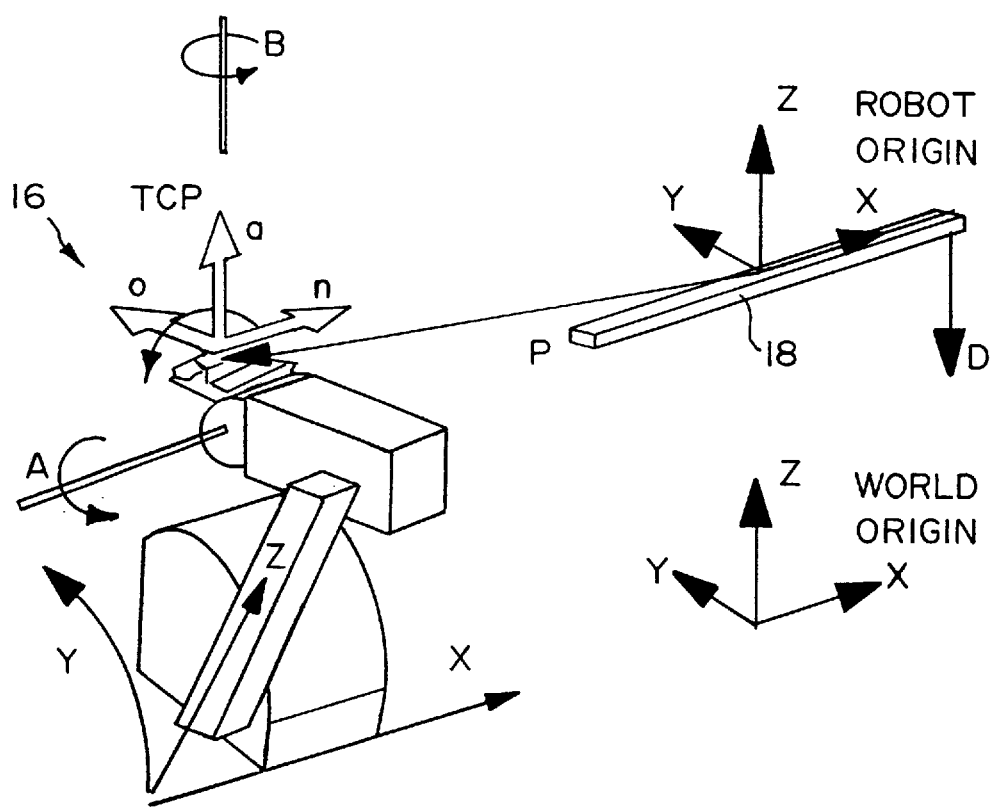
FIG. 21 is a perspective partial elevated view of a robot and die rail, and several coordinate systems that may be utilized to describe the respective locations thereof; and Each of FIGS. 22(a), 22(b), 22(c), 22(d), 23(a), 23(b), 23(c), 23(d), 23(e), 23(f), 24(a), 24(b), 24(c), 24(d), 25(a), 25(b), 25(c), 25(d), 26(a), 26(b), 26(c), 26(d), 27(a), 27(b), 27(c), 27(d), 27(e) and 27(f) illustrate a different part being disengaged and unloaded from a bending apparatus having a particular punch tool, and comprises a plurality of snapshots of the workpiece as it is unloaded.

FIG. 21 illustrates a robot 16 in joint space coordinates with respect to a robot origin, and in Cartesian space coordinates with respect to a designated world origin. The movements of a robot provided in a BM100 bending work station are expressed by five coordinates (X, Y, Z, A, B) in joint space, which relate a TCP (Tool Center Point) to the robot origin. Since the motion planning performed by the planning system illustrated herein is calculated in Cartesian coordinates with respect to a specific reference point, which may be called a world origin, it is necessary to have a mechanism for converting robot position representations from one system to another. More particularly, the robot is controlled by specifying the position of the robot TCP in joint space (X, Y, Z, A, B), while positioning of the robot by the motion planning systems frequently must be represented in Cartesian coordinates with respect to a world origin. Accordingly, the system should be provided with a device for performing a forward kinematics calculation, thus converting a position of the robot represented in joint coordinates (X, Y, Z, A, B) to world coordinates (X, Y, Z, Pitch, Yaw). The forward kinematics solution determines the robot hand position in world coordinates from known joint angles. The reverse kinematic solution determines a set of joint values that would move the robot hand to a position specified in world coordinates. In order to implement such forward and reverse kinematic solutions, the robot and press brake motions may be modeled to using Denavit-Hartenberg (D-H) convention to represent transformations between subsequent links. While following D-H convention, a Jacobean matrix may be computed, which relates differential changes in joint space to changes in world space at a particular robot configuration. More detailed information regarding forward and reverse kinematics (and Robotics Mechanics and Control generally) is given by John J. Craig in "Introduction to Robotics Mechanics and Control," Second Ed., Addison-Wesley Publishing Co., Reading, Mass. (1989), the content of which is expressly incorporated by reference herein in its entirety.

While the invention has been described with reference to several illustrated embodiments, it is understood that the words which have been used herein are words of description, rather than words of limitation. Changes may be made, within the purview of the appended claims, without departing from the scope and spirit of the invention in its aspects. Although the invention has been described herein in reference to particular means, materials, and embodiments, it is understood that the invention is not to be limited to the particulars disclosed herein, and that the invention extends to all equivalent structures, methods, and uses, such as are within the scope of the appended claims.

What is claimed:

1. In a computer having at least one processor and a memory, a method for planning motion of a robot within free space, restricted by obstacles, from an initial position to a goal position, said obstacles comprising components of a bending apparatus, said method comprising:

proposing, for a movement within a sequence of movements, a plurality of proposed movements to be made by the robot;

modeling at least a portion of the robot and the obstacles that restrict the free space;

determining whether a collision will occur between the robot and an obstacle for a proposed movement being executed as said movement within said sequence of movements; and generating a plan including said sequence of movements, by choosing, for each movement in said sequence of movements, a proposed movement that will not result in a collision and that will bring the robot closer to the goal position, said generating a plan comprising planning a gross motion plan including movements of the robot in the free-space and planning a fine motion plan including movements of the robot to and from the bending apparatus.

2. The method according to claim 1, wherein said robot comprises a robot gripper for holding and maneuvering a workpiece throughout a sequence of bending operations to be performed by the bending apparatus.

3. The method according to claim 2, wherein:

said fine motion planning comprises planning a plurality of free space fine motion solution paths that extend between a plurality of respective pairs of positions, $q_i$ and $q_g$; and said gross motion planning comprises planning a plurality of free space gross motion solution paths that extend between a plurality of respective pairs of positions, $Q_i$ and $Q_g$.

4. The method according to claim 3, wherein said fine motion planning comprises performing said steps of proposing, modeling, determining and generating, for each pair of positions $q_i$ and $q_g$, said proposing step comprising specifying a plurality of movements in configuration space for the said movement in said sequence of movements and identifying which ones of the specified plurality of movements are feasible by performing collision checking.

5. The method according to claim 4, wherein said gross motion planning comprises performing said steps of proposing, modeling, determining and generating, for each pair of positions $Q_i$ and $Q_g$, said proposing step comprising proposing a set of movements within a maximal overlapping parallelepiped within the free space of said robot.

6. The method according to claim 3, wherein said gross motion planning comprises performing said steps of proposing, modeling, determining and generating, for each pair of positions $Q_i$ and $Q_g$, said proposing step comprising proposing a set of movements within a maximal overlapping parallelepiped within the free space of said robot.

7. The method according to claim 2, further comprising:

calculating whether a simple collision-free path can be determined;

forming a plan including movements for traversing the simple collision-free path; and inhibiting operation of said steps of proposing, determining and generating.

8. The method according to claim 2, wherein said gross motion plan comprises movements of the robot from a loading position, where a workpiece is retrieved by the robot gripper, to a bending stage position of the bending apparatus.

9. The method according to claim 2, wherein said fine motion plan comprises movements of the robot for loading a workpiece held by the robot gripper into a die space defined between a punch tool and die of the bending apparatus.

10. The method according to claim 2, wherein said gross motion plan comprises movements of the robot for moving a workpiece held by the robot gripper from a first bending stage position to a second bending stage position of the bending apparatus.

11. The method according to claim 2, wherein said fine motion plan comprises movements of the robot for unloading a workpiece held by the robot gripper from a die space defined between a punch tool and die of the bending apparatus.

12. The method according to claim 2, wherein said gross motion plan comprises movements of the robot for moving a workpiece held by the robot gripper from a final bending stage position of the bending apparatus to an unloading position.

13. The method of claim 2, wherein said modeling comprises modeling the workpiece held by the robot and said determining comprises determining whether a collision will occur between the workpiece held by the robot and an obstacle for a proposed movement.

14. The method according to claim 1, further comprising estimating a cost to be associated with each proposed movement, whereby said generating step comprises generating a plan including said sequence of movements, by choosing, for each movement in the sequence of movements, a proposed movement that will not result in a collision, that will bring the robot closer to the goal position, and that has a lowest estimated cost.

15. The method according to claim 14, wherein the estimated cost for a particular proposed movement comprises a Euclidian distance to the goal position from the position of the robot after said particular proposed movement is made as said movement in said sequence of movements.

16. The method according to claim 14, wherein the estimated cost for a particular proposed movement comprises an estimated value indicative of the robot travel time to move from a position after an another movement is made to a position of the robot after said particular proposed movement is made.

17. The method according to claim 1, further comprising, before said proposing step, specifying a plurality of movements in configuration space for said movement in said sequence of movements, and identifying which ones of the specified plurality of movements are feasible by performing collision checking, said proposing step comprising proposing movements from among the movements identified as feasible.

18. The method according to claim 17, wherein the specified plurality of movements specified for said movement in said sequence of movements comprises a plurality of movements in directions which collectively surround the position of the robot at the said another movement in said sequence of movements.

19. The method according to claim 17, wherein the specified plurality of movements for movement in said sequence of movements comprises movements in a plurality of intelligent movement directions.

20. The method according to claim 19, said method planning motion of said robot in order to unload a malleable workpiece from a tooling punch of the bending apparatus after completion of a bend, said intelligent directions comprising a downward movement of said robot causing said workpiece to move downward.

21. The method according to claim 19, said method planning motion of said robot in order to unload a malleable workpiece from a tooling punch of the bending apparatus after completion of a bend, said intelligent directions comprising a backward movement of said robot causing said workpiece to be backed out of the bending apparatus.

22. The method according to claim 19, said method planning motion of said robot in order to unload a malleable workpiece from a tooling punch of the bending apparatus after completion of a bend, said intelligent directions comprising a movement of said robot causing said workpiece to change in pitch from an inclined position towards a horizontal position.

23. The method according to claim 19, said method planning motion of said robot in order to unload a malleable workpiece from a tooling punch of the bending apparatus after completion of a bend, said intelligent directions comprising a movement of said robot causing said workpiece to be moved downward, to be moved backward away from said bending apparatus, and to drop in pitch from an angled position towards a horizontal position.

24. The method according to claim 1, further comprising:
  forming an m-tree representation of a work space of said robot; and
  computing maximal overlapping rectangloids within the free space of said m-tree representation of said work space.

25. The method according to claim 24, wherein said m-tree representation is an octree representation.

26. The method according to claim 24, wherein said maximal overlapping rectangloids comprise maximal overlapping parallelepipeds.

27. The method according to claim 24, wherein said proposing step comprises proposing for said movement in said sequence of movements, a set of movements of the robot to locations that fall within a maximal overlapping rectangloid within which the robot is located immediately after the another movement of said sequence of movements.

28. The method according to claim 27, wherein said set of movements comprises:
  translating said robot to any one of eight corners of a presently occupied maximal overlapping rectangloid; and
  moving said robot along any one of a plurality of predetermined directions which bring said robot to a position that corresponds to said goal position.

29. The method according to claim 27, wherein said set of movements comprises:
  moving said robot in a first of three orthogonal directions to a position along the first orthogonal direction which corresponds to said goal position;
  moving said robot in a second of the three orthogonal directions to a position along the second orthogonal direction which corresponds to said goal position;
  moving said robot in a third of the three orthogonal directions to a position along the third orthogonal direction which corresponds to said goal position;
  moving said robot in order to adjust a pitch of a gripper of said robot; and
  moving said robot in order to adjust both pitch and yaw of the gripper of said robot.

30. The method according to claim 27, wherein said set of movements comprises moving along one of a plurality of orthogonal directions only when such movement would bring the robot to an orthogonal position that corresponds to the goal position.

31. The method according to claim 1, further comprising integrating said gross motion plan with said fine motion plan to generate said plan.

32. The method according to claim 1, wherein said robot comprises a robot gripper for holding a workpiece, and said fine motion plan comprises movements of the robot for loading and unloading the workpiece into a die space defined by a punch tool and die of the bending apparatus.

33. The method of claim 1, wherein said free space is a 3-D space environment, said plurality of proposed movements including a 3-D movement to be made by the robot.

34. A system for planning motion of a robot within free space, restricted by obstacles, from an initial position to a goal position, said obstacles comprising components of a bending apparatus, said system comprising:
  proposing means for proposing, for a movement within a sequence of movements, a plurality of proposed movements to be made by said robot;
  modeling means for modeling at least a portion of said robot and the obstacles that restrict the free space;
  determining means for determining whether a collision will occur between the robot and an obstacle for a proposed movement being executed as said movement within said sequence of movements; and
  generating means for generating a plan including said sequence of movements, by choosing, for each movement in said sequence of movements, a proposed movement that will not result in a collision and that will bring said robot closer to the goal position, said generating means comprising gross motion planning means for planning a gross motion plan including movements of said robot in the free-space and fine motion planning means for planning a fine-motion plan including movements of said robot to and from the bending apparatus.

35. The system according to claim 34, wherein said robot comprises a robot gripper for holding and maneuvering a workpiece throughout a sequence of bending operations to be performed by the bending apparatus.

36. The system according to claim 35, wherein:
  said fine motion planning means comprises means for planning a plurality of free space fine motion solution paths that extend between a plurality of respective pairs of positions, $q_i$ and $q_g$; and
  said gross motion planning means comprises means for planning a plurality of free space gross motion solution paths that extend between a plurality of respective pairs of positions, $Q_i$ and $Q_g$.

37. The system according to claim 36, wherein said fine motion planning means comprises means for operating said proposing means, modeling means, determining means, and generating means, for each pair of positions $q_i$ and $q_g$, said proposing means comprising specifying means for specifying a plurality of movements in configuration space for said movement in said sequence of movements and identifying means for identifying which ones of the specified plurality of movements are feasible by performing collision checking.

38. The system according to claim 36, wherein said gross motion planning means comprises means for operating said proposing means, modeling means, determining means and generating means, for each pair of positions $Q_i$ and $Q_q$, said proposing means comprising means for proposing a set of movements within a maximal overlapping parallelepiped within the free space of said robot.

39. The system according to claim 36, wherein said gross motion planning means comprises means for operating said proposing means, modeling means, determining means and generating means, for each pair of positions $Q_i$ and $Q_g$, said proposing means comprising means for proposing a set of movements within a maximal overlapping parallelepiped within the free space of said robot.

40. The system according to claim 35, further comprising:
  calculating means for calculating whether a simple collision-free path can be determined;
  forming means for forming a plan including movements for traversing the simple collision-free path; and
  inhibiting means for inhibiting operation of said proposing means, determining means, and generating means.

41. The system according to claim 35, wherein said gross motion plan comprises movements of the robot from a loading position, where a workpiece is retrieved by the robot gripper, to a bending stage position of the bending apparatus.

42. The system according to claim 35, wherein said fine motion plan comprises movements of the robot for loading a workpiece held by the robot gripper into a die space defined between a punch tool and die of the bending apparatus.

43. The system according to claim 35, wherein said gross motion plan comprises movements of the robot for moving a workpiece held by the robot gripper from a first bending stage position to a second bending stage position of the bending apparatus.

44. The system according to claim 35, wherein said fine motion plan comprises movements of the robot for unloading a workpiece held by the robot gripper from a die space defined between a punch tool and die of the bending apparatus.

45. The system according to claim 35, wherein said gross motion plan comprises movements of the robot for moving a workpiece held by the robot gripper from a final bending stage position of the bending apparatus to an unloading position.

46. The system of claim 35, wherein said modeling means comprises means for modeling the workpiece held by the robot and said determining means comprises means for determining whether a collision will occur between the workpiece held by the robot and an obstacle for a proposed movement.

47. The system according to claim 34, further comprising estimating means for estimating a cost to be associated with each proposed movement, whereby said generating means comprise means for generating a plan including said sequence of movements, by choosing, for each movement in said sequence of movements, a proposed movement that will not result in a collision, that will bring the robot closer to the goal position, and that has a lowest estimated cost.

48. The system according to claim 47, wherein the estimated cost for a particular proposed movement comprises a Euclidian distance to the goal position from the position of the robot after said particular proposed movement is made as said movement in said sequence of movements.

49. The system according to claim 47, wherein the estimated cost for a particular proposed movement comprises an estimated value indicative of the robot's travel time from an another movement to the position of the robot after said particular proposed movement is made as said mth movement.

50. The system according to claim 34, further comprising specifying means for specifying a plurality of movements in configuration space for said movement in said sequence of movements and identifying means for identifying which ones of the specified plurality of movements are feasible by performing collision checking, said proposing means comprising means for proposing movements from among the movements identified by said identifying means as feasible.

51. The system according to claim 50, wherein the specified plurality of movements specified for said movement in a sequence of movements comprises a plurality of movements and directions which collectively surround a position of the robot at the said another movement in said sequence of movements.

52. The system according to claim 50, wherein the specified plurality of movements for said movement in said sequence of movements comprises movements in a plurality of intelligent movement directions.

53. The system according to claim 52, said system further comprising means for planning motion of said robot in order to unload a malleable workpiece from a tooling punch of the bending apparatus after completion of a bend, said intelligent directions comprising a downward movement of said robot causing said workpiece to move downward.

54. The system according to claim 52, said system further comprising means for planning motion of said robot in order to unload a malleable workpiece from a tooling punch of the bending apparatus after completion of a bend, said intelligent directions comprising a backward movement of said robot causing said workpiece to be backed out of the bending apparatus.

55. The system according to claim 52, said system further comprising means for planning motion of said robot in order to unload a malleable workpiece from a tooling punch of the bending apparatus after completion of a bend, said intelligent directions comprising a movement of said robot causing said workpiece to change in pitch from an angled position towards a horizontal position.

56. The system according to claim 52, said system further comprising means for planning motion of said robot in order to unload a malleable workpiece from a tooling punch of the bending apparatus after completion of a bend, said intelligent directions comprising a movement of said robot causing said workpiece to be moved downward, to be moved backward and away from said bending apparatus, and to drop in pitch from an angled position towards a horizontal position.

57. The system according to claim 34, further comprising:
   forming means for forming an m-tree representation of a work space of said robot; and
   computing means for computing maximal overlapping rectangloids within the free space of said m-tree representation of said work space.

58. The method according to claim 57, wherein said m-tree representation is an octree representation.

59. The system according to claim 57, wherein said maximal overlapping rectangloids comprise maximal overlapping parallelepipeds.

60. The system according to claim 57, wherein said proposing means comprises means for proposing, for said movement in said sequence of movements, a set of movements of the robot to locations that fall within a maximal overlapping rectangloid within which the robot is located immediately after the another movement of said sequence of movements.

61. The system according to claim 60, wherein said set of movements comprises:
   translating said robot to any one of eight corners of a present maximal overlapping rectangloid; and
   moving said robot along any one of a plurality of predetermined directions which bring said robot to a position along a predetermined direction that corresponds to said goal position.

62. The system according to claim 60, wherein said set of movements comprises:
   moving said robot in a first of three orthogonal directions to a position along the first orthogonal direction which corresponds to said goal position;
   moving said robot in a second of the three orthogonal directions to a position along the second orthogonal direction which corresponds to said goal position;

moving said robot in a third of the three orthogonal directions to a position along the third orthogonal direction which corresponds to said goal position;

moving said robot in order to adjust a pitch of a gripper of said robot; and moving said robot in order to adjust both the pitch and yaw of the gripper of said robot.

63. The system according to claim 60, wherein said set of movements comprises moving along one of a plurality of orthogonal directions only when the movement would bring the robot to an orthogonal position that corresponds to the goal position.

64. The system according to claim 34, further comprising means for integrating said gross motion plan with said fine motion plan to generate said plan.

65. The system according to claim 34, wherein said robot comprises a robot gripper for holding a workpiece, and said fine motion plan comprises movements of the robot for loading and unloading the workpiece into a die space defined by a punch tool and die of the bending apparatus.

66. The system of claim 34, wherein said free space is a 3-D space environment, said plurality of proposed movements including a 3-D movement to be made by the robot.

* * * * *